(12) United States Patent
Coenen

(10) Patent No.: US 11,624,277 B2
(45) Date of Patent: Apr. 11, 2023

(54) DETERMINING FRACTURE DRIVEN INTERACTIONS BETWEEN WELLBORES

(71) Applicant: Reveal Energy Services, Inc., Houston, TX (US)

(72) Inventor: Erica Wilhelmina Catharina Coenen, Spring, TX (US)

(73) Assignee: Reveal Energy Services, Inc., Houston, TX (US)

( * ) Notice: Subject to any disclaimer, the term of this patent is extended or adjusted under 35 U.S.C. 154(b) by 0 days.

(21) Appl. No.: 17/380,752

(22) Filed: Jul. 20, 2021

(65) Prior Publication Data

US 2022/0018245 A1    Jan. 20, 2022

Related U.S. Application Data

(60) Provisional application No. 63/053,993, filed on Jul. 20, 2020.

(51) Int. Cl.
*E21B 47/06* (2012.01)
*E21B 43/17* (2006.01)
*G01V 99/00* (2009.01)
*E21B 43/26* (2006.01)

(52) U.S. Cl.
CPC .............. *E21B 47/06* (2013.01); *E21B 43/26* (2013.01); *G01V 99/005* (2013.01)

(58) Field of Classification Search
CPC .......... E21B 43/17; E21B 43/30; E21B 43/26; E21B 49/008; E21B 2200/20; E21B 47/06
See application file for complete search history.

(56) References Cited

U.S. PATENT DOCUMENTS

| 5,431,227 | A | 7/1995 | Montgomery et al. |
| 5,771,170 | A | 6/1998 | Withers |
| 6,776,235 | B1 | 8/2004 | England |
| 8,184,502 | B2 | 5/2012 | Xu et al. |

(Continued)

FOREIGN PATENT DOCUMENTS

| EP | 3084124 | 5/2019 |
| WO | WO2018009407 | 1/2018 |
| WO | WO2021183950 | 9/2021 |

OTHER PUBLICATIONS

Daneshy et al., "Horizontal Well Frac-Driven Interactions: Types, Consequences, and Damage Mitigation," JPT, Jun. 2019, 45-47.

(Continued)

*Primary Examiner* — Kenneth L Thompson
(74) *Attorney, Agent, or Firm* — Fish & Richardson P.C.

(57) ABSTRACT

Techniques for determining a fracture driven interaction include identifying pressure response data from one or more pressure sensors that are in direct fluid communication with a fluid at least partially enclosed within one or more monitor wellbores formed from a terranean surface to one or more subterranean formations; calculating at least one pressure response value from the pressure response data; determining the fracture driven interaction between the treatment wellbore and at least one of the one or more monitor wellbores based at least in part on the calculated at least one pressure response value; and preparing a graphic representation of the determined FDI for display on a graphical user interface.

48 Claims, 13 Drawing Sheets

(56) References Cited

U.S. PATENT DOCUMENTS

| | | | |
|---|---|---|---|
| 8,439,116 B2 | 5/2013 | East et al. | |
| 8,494,827 B2 | 7/2013 | Mutlu et al. | |
| 9,187,992 B2* | 11/2015 | Cherian | E21B 47/06 |
| 9,507,889 B2 | 11/2016 | Chapman et al. | |
| 9,809,742 B2 | 11/2017 | Zhou et al. | |
| 9,988,895 B2 | 6/2018 | Roussel et al. | |
| 9,988,900 B2 | 6/2018 | Kampfer et al. | |
| 10,030,497 B2 | 7/2018 | Dawson et al. | |
| 10,215,014 B2 | 2/2019 | Dawson et al. | |
| 10,494,918 B2 | 12/2019 | Coenen et al. | |
| 10,513,923 B2 | 12/2019 | Coenen et al. | |
| 10,557,344 B2 | 2/2020 | Kashikar et al. | |
| 10,808,527 B2 | 10/2020 | Kashikar et al. | |
| 11,187,078 B2* | 11/2021 | Thore | G01N 15/0826 |
| 11,308,409 B1* | 4/2022 | Molina Ortiz | G06N 5/02 |
| 2003/0150263 A1 | 8/2003 | Economides et al. | |
| 2008/0190603 A1 | 8/2008 | Brannon | |
| 2009/0145660 A1 | 6/2009 | Johnson et al. | |
| 2009/0188665 A1 | 7/2009 | Tubel et al. | |
| 2009/0281776 A1 | 11/2009 | Cheng et al. | |
| 2010/0004906 A1 | 1/2010 | Searles et al. | |
| 2011/0251796 A1* | 10/2011 | Waid | E21B 49/008 702/11 |
| 2012/0241152 A1 | 9/2012 | Brannon | |
| 2012/0296619 A1 | 11/2012 | Maliassov et al. | |
| 2013/0087325 A1 | 4/2013 | Bartko | |
| 2013/0110485 A1* | 5/2013 | Li | G01V 99/005 703/10 |
| 2013/0140031 A1 | 6/2013 | Cohen et al. | |
| 2014/0067353 A1 | 3/2014 | Shelley et al. | |
| 2015/0075777 A1 | 3/2015 | Walters et al. | |
| 2015/0075779 A1 | 3/2015 | Walters et al. | |
| 2015/0083398 A1 | 3/2015 | Dawson | |
| 2015/0176394 A1 | 6/2015 | Roussel et al. | |
| 2015/0204175 A1 | 7/2015 | Soliman et al. | |
| 2015/0241584 A1 | 8/2015 | Aarre | |
| 2016/0003020 A1 | 1/2016 | Sharma | |
| 2016/0053611 A1 | 2/2016 | Moos | |
| 2016/0061022 A1 | 3/2016 | McCoy | |
| 2016/0108705 A1 | 4/2016 | Maxwell | |
| 2016/0177693 A1 | 6/2016 | Gomaa et al. | |
| 2016/0237799 A1 | 8/2016 | Dawson | |
| 2016/0333680 A1 | 11/2016 | Richter et al. | |
| 2017/0002652 A1 | 1/2017 | Kampfer et al. | |
| 2017/0022808 A1 | 1/2017 | Busetti et al. | |
| 2017/0075003 A1 | 3/2017 | Dusterhoft et al. | |
| 2017/0114613 A1 | 4/2017 | Lecerf et al. | |
| 2017/0122077 A1 | 5/2017 | Shahri et al. | |
| 2017/0145793 A1 | 5/2017 | Ouenes | |
| 2017/0247995 A1* | 8/2017 | Crews | G01V 1/288 |
| 2017/0370208 A1 | 12/2017 | Dawson | |
| 2018/0003033 A1 | 1/2018 | Dawson | |
| 2018/0135401 A1 | 5/2018 | Dykstra et al. | |
| 2018/0148999 A1 | 5/2018 | Roussel | |
| 2018/0217285 A1 | 8/2018 | Walters et al. | |
| 2018/0258760 A1 | 9/2018 | Kashikar et al. | |
| 2019/0024489 A1 | 1/2019 | Nguyen et al. | |
| 2019/0024505 A1 | 1/2019 | Coenen et al. | |
| 2019/0026409 A1 | 1/2019 | Whilhelmina et al. | |
| 2019/0128110 A1 | 5/2019 | Spicer et al. | |
| 2019/0162871 A1 | 5/2019 | Dell et al. | |
| 2019/0309618 A1* | 10/2019 | Inyang | E21B 49/006 |
| 2020/0123899 A1 | 4/2020 | Whilhelmina et al. | |
| 2020/0190977 A1 | 6/2020 | Kashikar et al. | |
| 2021/0062646 A1 | 3/2021 | Wilhelmina et al. | |
| 2021/0095558 A1* | 4/2021 | Klenner | G01V 9/00 |

OTHER PUBLICATIONS

Daneshy, "Intra-Well Frac-Driven Interactions FDIs: Types, Causes, Consequences and Diagnostic Value Learnt from Actual BH Data," Presented at the SPE Hydraulic Fracturing Technology Conference and Exhibition, The Woodlands, TX, Feb. 4-6, 2020; SPE J., 2020, 1-17.

Esquivel et al., "Optimizing the Development of the Haynesville Shale—Lessons-Learned from the Well-to-Well Hydraulic Fracture Interference," Presented at the Unconventional Resources Technology Conference, Austin, TX, Jul. 24-26, 2017, 1-22.

Kamrin, "Quasi-Analytical Solution of Pore Fluid Pressurization in a Crack Due to Adjacent Crack Pressurization", Associate Professor in the Department of Mechanical Engineering—Massachusetts Institute of Technology, 9 pages.

Meng et al., "Evaluation of the Eshelby Solution for the Ellipsoidal Inclusion and Heterogeneity", Stanford Rock Fracture Project, 2011, 22:C1-C10.

* cited by examiner

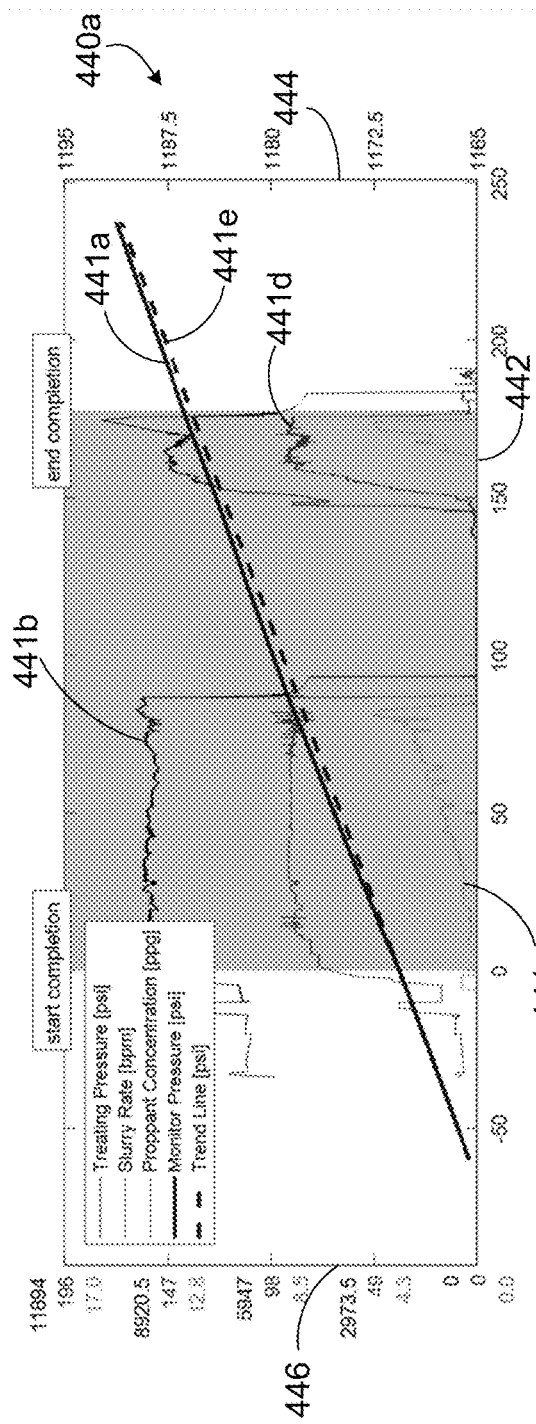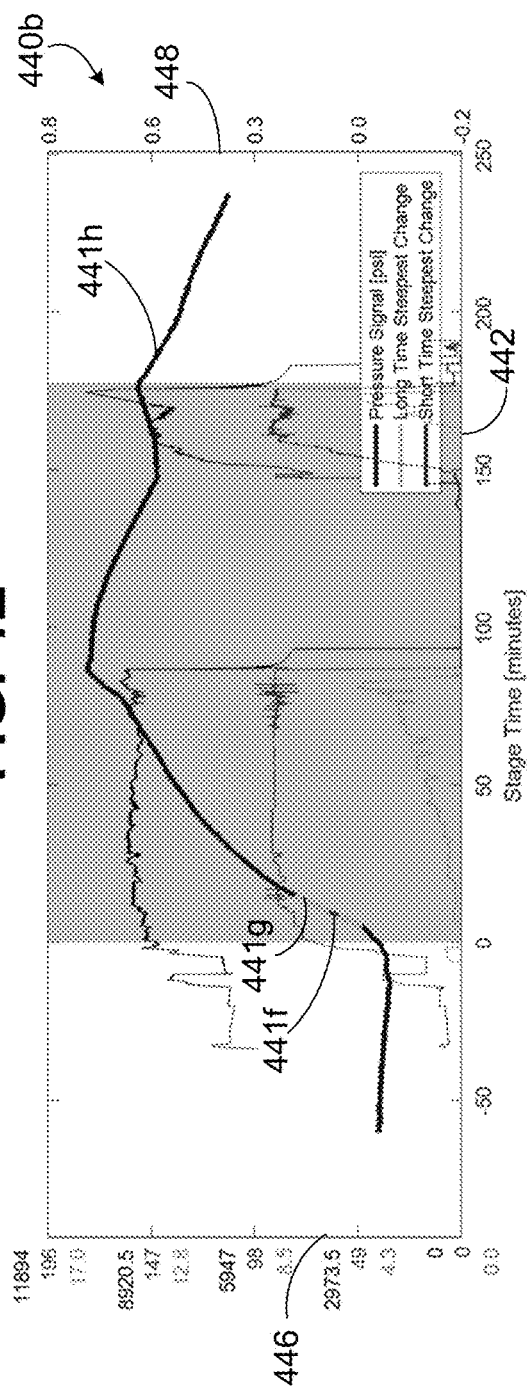

DETERMINING FRACTURE DRIVEN INTERACTIONS BETWEEN WELLBORES

CROSS-REFERENCE TO RELATED APPLICATION

This application claims priority under 35 U.S.C. § 119 to U.S. Provisional Patent Application Ser. No. 63/053,993, filed on Jul. 20, 2020, the entire contents of which are incorporated by reference herein.

TECHNICAL FIELD

This specification relates to systems and method for determining fracture driven interactions (FDIs) between two or more wellbores.

BACKGROUND

Certain geologic formations, such as unconventional reservoirs in shale, sandstone, and other rock types, often exhibit increased hydrocarbon production subsequent to one or more completion operations being performed. One such completion operation may be a hydraulic fracturing operation, in which a liquid is pumped into a wellbore to contact the geologic formation and generate fractures throughout the formation due to a pressure of the pumped liquid (e.g., that is greater than a fracture pressure of the rock formation). In some cases, an understanding of a size or other characteristics of the generated hydraulic fractures may be helpful in understanding a potential hydrocarbon production from the geologic formation.

SUMMARY

In a general implementation according to the present disclosure, a computer-implemented method includes identifying, with one or more hardware processors, pressure response data from one or more pressure sensors, each of the one or more pressure sensors in direct fluid communication with a fluid at least partially enclosed within one or more monitor wellbores formed from a terranean surface to one or more subterranean formations, the pressure response data including a recordable change in pressure of the fluid in response to a hydraulic fracturing treatment in a treatment wellbore formed from the terranean formation to initiate one or more hydraulic fractures from the treatment wellbore into the one or more subterranean formations; calculating, with the one or more hardware processors, at least one pressure response value from the pressure response data; determining, with the one or more hardware processors, a fracture driven interaction (FDI) between the treatment wellbore and at least one of the one or more monitor wellbores based at least in part on the calculated at least one pressure response value; and preparing, with the one or more hardware processors, a graphic representation of the determined FDI for display on a graphical user interface (GUI).

In an aspect combinable with the example implementation, the at least one pressure response value includes a dimensionless value that represents a pressure ratio.

In another aspect combinable with any of the previous aspects, the at least one pressure response value includes a ratio of a first pressure change from the pressure response data to a second pressure change of the pressure response data.

In another aspect combinable with any of the previous aspects, the first pressure change includes a difference in pressure of the fluid at a first time and a trend line pressure of the fluid.

In another aspect combinable with any of the previous aspects, the second pressure change includes a difference in pressure of the fluid at a second time subsequent to the first time and the trend line pressure of the fluid.

In another aspect combinable with any of the previous aspects, the first time includes a treatment end time of the hydraulic fracturing treatment.

In another aspect combinable with any of the previous aspects, the treatment end time includes a shut-in time of the treatment wellbore.

In another aspect combinable with any of the previous aspects, the second time includes a time subsequent to the treatment end time of the hydraulic fracturing treatment.

In another aspect combinable with any of the previous aspects, the time subsequent to the treatment end time includes a time in which a slope of a pressure curve of the recordable change in pressure of the fluid is substantially equal to a slope of a pressure curve of the trend line pressure.

In another aspect combinable with any of the previous aspects, the at least one pressure response value is between 0 and 1.

In another aspect combinable with any of the previous aspects, determining the FDI between the treatment wellbore and at least one of the one or more monitor wellbores based at least in part on the calculated at least one pressure response value includes determining, with the one or more hardware processors, that the FDI between the treatment wellbore and at least one of the one or more monitor wellbores is a direct fluid communication based at least in part on the calculated at least one pressure response value being between 0 and 0.5.

In another aspect combinable with any of the previous aspects, determining that the FDI between the treatment wellbore and at least one of the one or more monitor wellbores is the direct fluid communication based at least in part on the calculated at least one pressure response value being between 0 and 0.5 includes determining, with the one or more hardware processors, that the FDI between the treatment wellbore and at least one of the one or more monitor wellbores is the direct fluid communication based at least in part on the calculated at least one pressure response value being between 0 and 0.3.

In another aspect combinable with any of the previous aspects, determining the FDI between the treatment wellbore and at least one of the one or more monitor wellbores based at least in part on the calculated at least one pressure response value includes determining, with the one or more hardware processors, that the FDI between the treatment wellbore and at least one of the one or more monitor wellbores is a fluid migration based at least in part on the calculated at least one pressure response value being between 0.5 and 1.

In another aspect combinable with any of the previous aspects, determining that the FDI between the treatment wellbore and at least one of the one or more monitor wellbores is the fluid migration based at least in part on the calculated at least one pressure response value being between 0.5 and 1 includes determining, with the one or more hardware processors, that the FDI between the treatment wellbore and at least one of the one or more monitor wellbores is the direct fluid communication based at least in part on the calculated at least one pressure response value being between 0.7 and 1.

In another aspect combinable with any of the previous aspects, determining the FDI between the treatment wellbore and at least one of the one or more monitor wellbores based at least in part on the calculated at least one pressure response value includes determining, with the one or more hardware processors, the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment.

In another aspect combinable with any of the previous aspects, the short term recordable change in pressure of the fluid includes a maximum pressure increase of the fluid over a first time duration between a treatment start of the hydraulic fracturing treatment and the treatment end time of the hydraulic fracturing treatment.

In another aspect combinable with any of the previous aspects, the long term recordable change in pressure of the fluid includes a maximum pressure increase of the fluid over a second time duration between the treatment start of the hydraulic fracturing treatment and the treatment end time of the hydraulic fracturing treatment.

In another aspect combinable with any of the previous aspects, the first time duration includes about 60 seconds, and the second time duration includes about 10 minutes.

In another aspect combinable with any of the previous aspects, determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment includes determining, with the one or more hardware processors, that the FDI between the treatment wellbore and at least one of the one or more monitor wellbores is a direct fluid communication based at least in part on the calculated at least one pressure response value being between 0 and 0.5 and at least one of: the short term recordable change in pressure being greater than about 5% of a total pressure increase of the fluid between the treatment start time and the treatment end time, or the long term recordable change in pressure being greater than about 30% of the total pressure increase of the fluid between the treatment start time and the treatment end time.

In another aspect combinable with any of the previous aspects, determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment includes determining, with the one or more hardware processors, that the FDI between the treatment wellbore and at least one of the one or more monitor wellbores is a fluid migration based at least in part on the calculated at least one pressure response value being between 0.5 and 1 and at least one of: the short term recordable change in pressure being about 5% or less of a total pressure increase of the fluid between the treatment start time and the treatment end time, or the long term recordable change in pressure being about 30% or less of the total pressure increase of the fluid between the treatment start time and the treatment end time.

In another aspect combinable with any of the previous aspects, determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment includes determining, with the one or more hardware processors, that the FDI between the treatment wellbore and at least one of the one or more monitor wellbores is a poroelastic response based at least in part on the calculated at least one pressure response value being between 0 and 0.5 and at least one of: the short term recordable change in pressure being about 5% or less of a total pressure increase of the fluid between the treatment start time and the treatment end time, or the long term recordable change in pressure being about 30% or less of the total pressure increase of the fluid between the treatment start time and the treatment end time.

In another aspect combinable with any of the previous aspects, determining that the FDI between the treatment wellbore and at least one of the one or more monitor wellbores is the poroelastic response includes determining, with the one or more hardware processors, that the FDI between the treatment wellbore and at least one of the one or more monitor wellbores is the poroelastic response based at least in part on the calculated at least one pressure response value about 0 and at least one of the short term recordable change in pressure being about 5% or less of the total pressure increase of the fluid between the treatment start time and the treatment end time, or the long term recordable change in pressure being about 30% or less of the total pressure increase of the fluid between the treatment start time and the treatment end time.

In another aspect combinable with any of the previous aspects, determining the FDI between the treatment wellbore and at least one of the one or more monitor wellbores based at least in part on the calculated at least one pressure response value includes: determining, with the one or more hardware processors, that the FDI between the treatment wellbore and at least one of the one or more monitor wellbores is a null response based at least in part on the recordable change in pressure of the fluid in response to the hydraulic fracturing treatment being about zero relative to a trend line pressure of the fluid.

Other general implementations according to the present disclosure include computing systems and non-transitory, computer readable media. For example, another general implementation includes a distributed computing system that includes one or more memory modules; and one or more hardware processors communicably coupled to the one or more memory modules and configured to execute instructions stored in the one or more memory modules to perform operations including the steps of any one of the computer-implemented methods described herein.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF DRAWINGS

FIGS. 4A-4H illustrate charts that graphically illustrate pressure curves that qualitatively show FDIs between two or more wellbores.

DETAILED DESCRIPTION

Figure 1A:
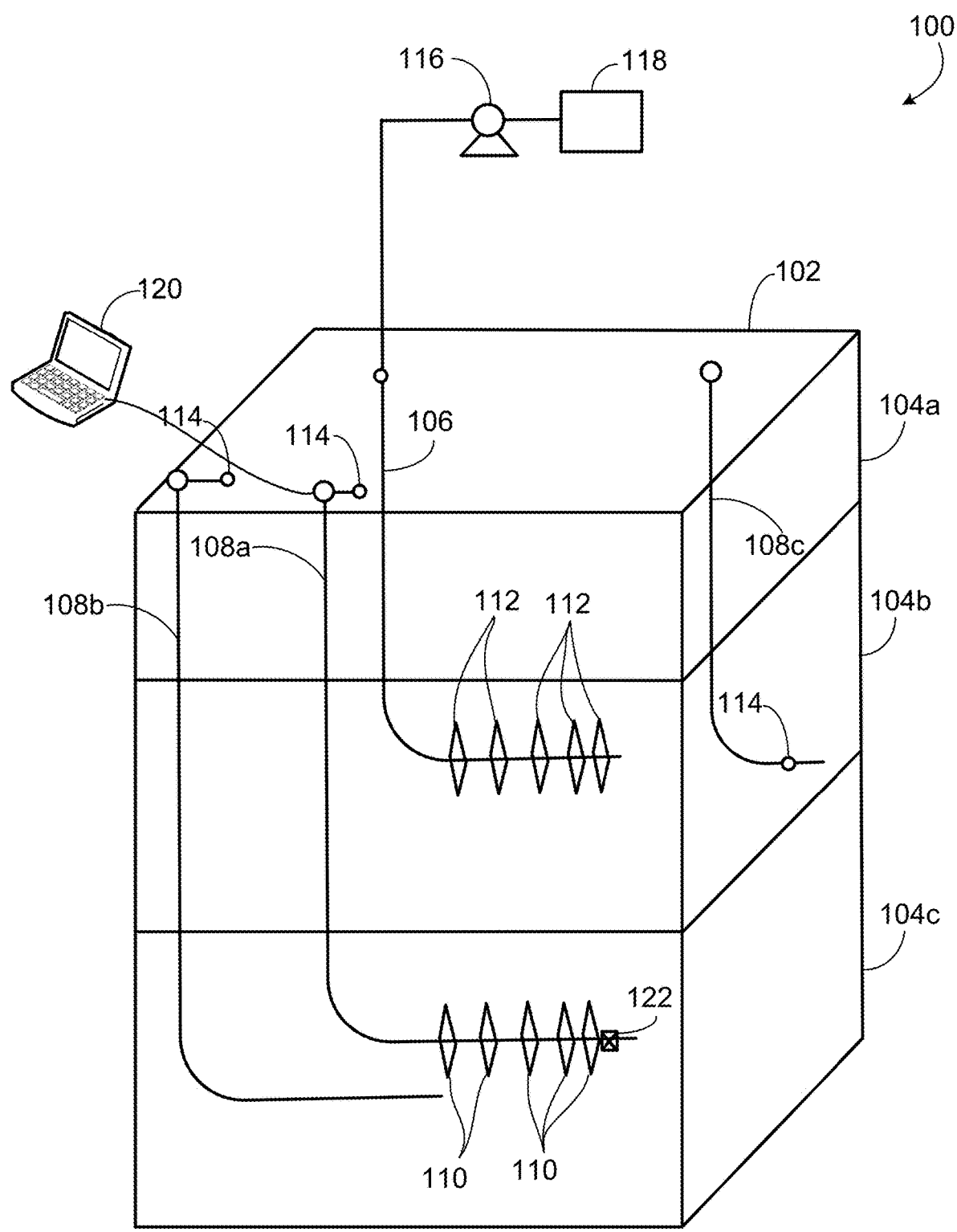
FIGS. 1A-1C are schematic illustrations of an example implementation of a hydraulic fracturing modeling system within a hydraulic fracturing system.
Figure 1B:
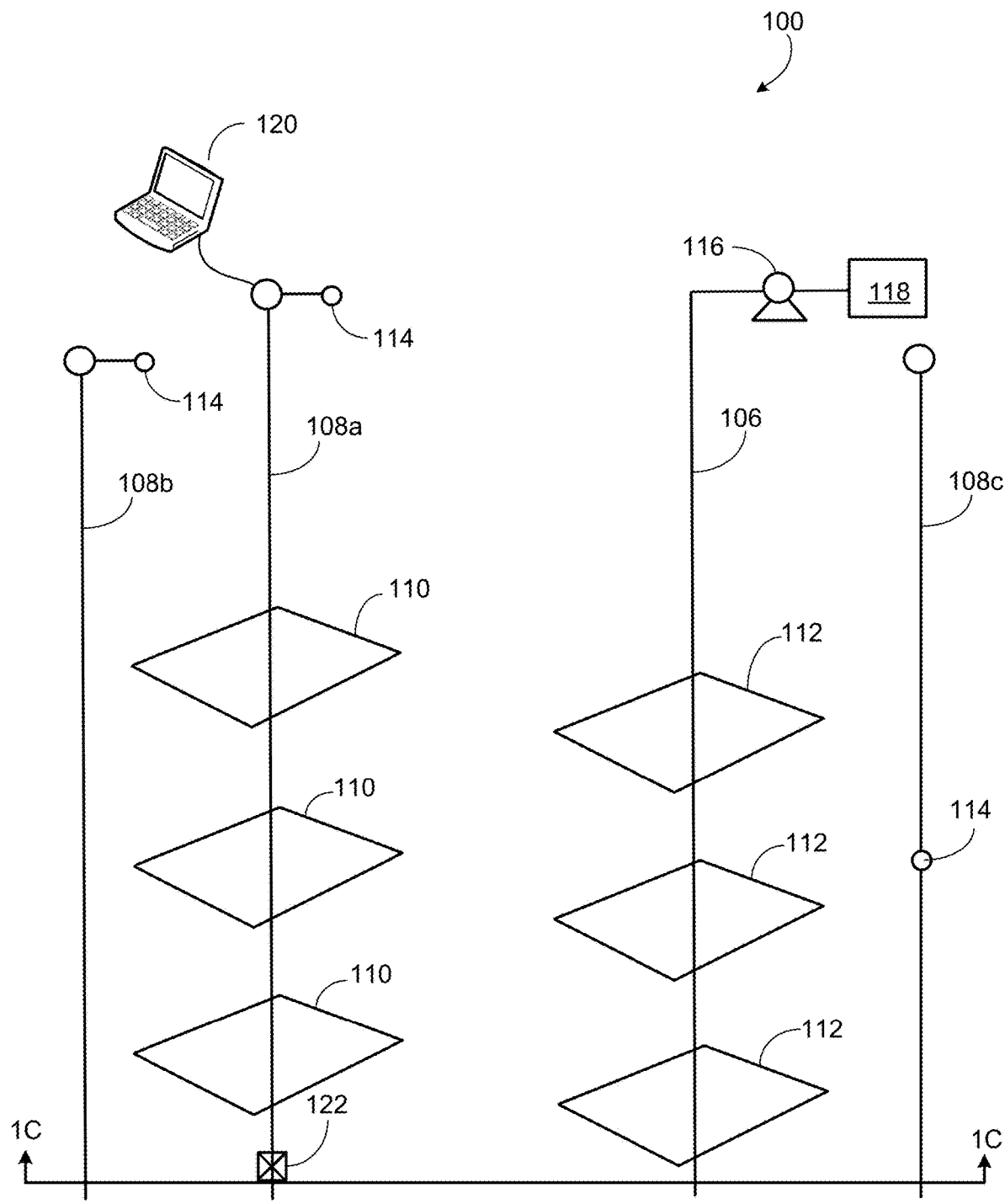
Figure 1C:
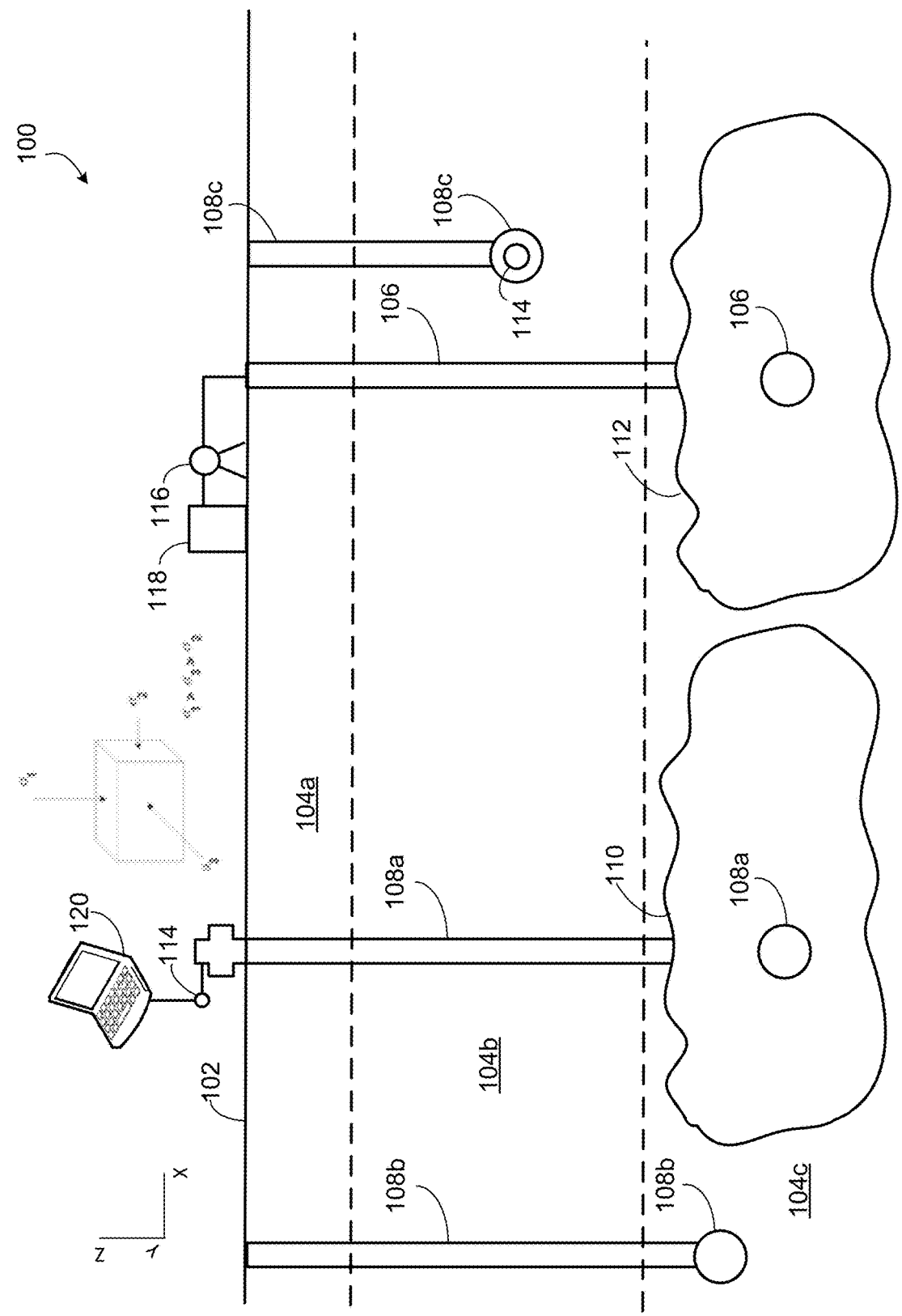

FIGS. 1A-1C are schematic illustrations of an example implementation of a hydraulic fracturing modeling system 120 (a structured data processing system) within a hydraulic fracturing system 100. As shown, system 100 includes one or more monitor wellbores (labeled 108a-108c in this example) that are formed from a terranean surface 102 to one or more subterranean zones 104a-104c located below the terranean surface 102. In this example, one, some, or all of the monitor wellbores 108a-108c may include a plug 122 or other fluid barrier positioned in the particular wellbore 108a-108c, and a pressure sensor 114 (shown fluidly coupled to each monitor wellbore 108a-108c). In some aspects, a pressure sensor is "fluidly coupled" to a liquid within a monitor wellbore for which is measures a change in pressure through a gas layer that lies between the liquid in the monitor wellbore and the pressure sensors. In some aspects, while such a gas layer may dampen a magnitude of the pressure signal recorded by the pressure sensor, the resultant signal can still be used (and in some cases confirmed by other pressure sensor measurements) in the techniques described herein. Thus, "fluidly coupled" may refer to a pressure sensor that is in direct fluid contact with the liquid in the monitor wellbore, as well as a pressure sensor that is in indirect fluid contact with the liquid in the monitor wellbore through a gas layer.

In this example, the pressure sensor 114 is located at or near a wellhead on one or more of the monitor wellbores 108a-108c, but in alternate implementations, the pressure sensor 114 may be positioned within one or more of the particular monitor wellbores 108a-108c below the terranean surface 102. Generally, according to the present disclosure, one or more of the monitor wellbores 108a-108c may be used to measure pressure variations in a fluid contained in the particular wellbore 108a-108c and, in some examples, one or more hydraulic fractures 110 formed from a particular monitor wellbore 108 (in this example, wellbore 108a) that are induced by a hydraulic fracturing fluid pumped into a treatment wellbore 106 to form one or more hydraulic fractures 112 formed from the treatment wellbore 106. Such induced pressure variations, as explained more fully below, may be used to determine information regarding the hydraulic fractures 110, hydraulic fractures 112, or even (all or a portion of) the wellbores 108a-108c.

Each monitor wellbore 108a-108c shown in FIGS. 1A-1C includes vertical and horizontal sections, as well as a radiused section that connects the vertical and horizontal portions. Generally, and in alternative implementations, each wellbore 108a-108c can include horizontal, vertical (e.g., only vertical), slant, curved, and other types of wellbore geometries and orientations. One or more wellbores 108a-108c may be uncased or include uncased sections, such as a horizontal portion that may be fully or partially an open hole completion.

Although illustrated as generally vertical portions and generally horizontal portions, such parts of the wellbores 108a-108c may deviate from exactly vertical and exactly horizontal (e.g., relative to the terranean surface 102) depending on the formation techniques of the particular wellbore 108a-108c, type of rock formation in the subterranean formations 104a-104c, and other factors. Generally, the present disclosure contemplates all conventional and novel techniques for forming the wellbores 108a-108c from the surface 102 into the subterranean formations 104a-104c.

In this example, wellbore 108a includes hydraulic fractures 110 emanating therefrom. Thus, wellbore 108a may be fluidly coupled to the particular subterranean formation in which it is formed (formation 104c) through the fractures 110. In this example, the pressure sensor 114 may be positioned at the surface 102 (e.g., in a wellhead of wellbore 108a). In some aspects, the wellbore 108a may include one or more perforations through which the fractures 110 are formed (e.g., through one or more stages of a hydraulic fracturing treatment process).

In this example, wellbore 108b is an example of an open-hole completion that includes no hydraulic fractures and, in some aspects, may also have no perforations. Thus, in this example, all or a substantial portion of the wellbore 108b is considered to be fluidly coupled to the subterranean formation 104c. In this example, the pressure sensor 114 mounted at the surface 102 (e.g., in the wellhead of the wellbore 108b) and is therefore positioned so as to be in fluid communication with fluids in the subterranean formation 104c that are fluidly coupled with a fluid (e.g., a liquid or mixed phase fluid) within the wellbore 108b.

In this example, wellbore 108c is another example of an open-hole completion that includes no hydraulic fractures and, in some aspects, may also have no perforations. In this example, the pressure sensor 114 is a downhole pressure sensor, positioned, e.g., at a horizontal portion of the wellbore 108c. In this example, the pressure sensor 114 of wellbore 108c is positioned within the wellbore 108c and is therefore positioned so as to be in direct fluid communication with fluids in the subterranean formation 104b.

System 100 in FIGS. 1A-1C, therefore, illustrates several different monitor wellbores. Although a single monitor wellbore is shown for each of the example wellbores 108a-108c, the system 100 may include more or fewer of each of these wellbores 108a-108c. For example, in some aspects, the system 100 may include many monitor wellbores 108a but not any of wellbores 108b or 108c. As another example, the system 100 may include a single or multiple monitor wellbores 108b or 108c only (along with one or many treatment wellbores 106). Thus, the present disclosure contemplates all variety of combinations of monitor and treatment wellbores within the system 100.

The treatment wellbore 106 shown in FIGS. 1A-1C includes vertical and horizontal sections, as well as a radiused section that connects the vertical and horizontal portions. Generally, and in alternative implementations, the wellbore 106 can include horizontal, vertical (e.g., only vertical), slant, curved, and other types of wellbore geometries and orientations. The treatment wellbore 106 may include a casing (not shown) that is cemented or otherwise secured to the wellbore wall to define a borehole in the inner volume of the casing. In alternative implementations, the wellbore 106 can be uncased or include uncased sections. Perforations (not specifically labeled) can be formed in the casing to allow fracturing fluids and/or other materials to flow out of the wellbore 106. Perforations can be formed using shape charges, a perforating gun, and/or other tools. Although illustrated as generally vertical portions and generally horizontal portions, such parts of the wellbore 106 may deviate from exactly vertical and exactly horizontal (e.g., relative to the terranean surface 102) depending on the formation techniques of the wellbore 106, type of rock formation in the subterranean formation 104b, and other factors. Generally, the present disclosure contemplates all conventional and novel techniques for forming the wellbore 106 from the surface 102 into the subterranean formation 104b. Generally, according to the present disclosure, the treatment wellbore 106 is used to form one or more hydraulic fractures 112 that can produce or enhance production of hydrocarbons or other fluids in the subterranean zone 104b (and other formations). A hydraulic fracturing fluid used to form such fractures 112, during formation of the fractures 112, may induce pressure variations in a fluid contained in one or more of the monitor wellbores 108a-108c, which may be used to determine one or more FDIs between the treatment wellbore 106 and the monitor wellbores 108a-108c.

Although three monitor wellbores 108a-108c and a single treatment wellbore 106 are shown in FIGS. 1A-1C, the present disclosure contemplates that the system 100 may include more or fewer monitor wellbores and more treatment wellbores. For example, in some aspects, there may be multiple (e.g., 10 or more) wellbores formed into the subterranean zones 104a-104c, with a single wellbore assigned to be the monitor wellbore and the remaining wellbores assigned to be treatment wellbores. Alternatively, there may be multiple monitor wellbore and multiple treatment wellbores within a set of wellbores formed into the subterranean zone.

Further, in some aspects, one or more wellbores in a set of wellbores formed into the subterranean zones 104a-104c may be initially designated as monitor wellbores while one or more other wellbores may be designated as treatment wellbores. Such initial designations, according to the present disclosure, may be adjusted over time such that wellbores initially designated monitor wellbores may be re-designated as treatment wellbores while wellbores initially designated treatment wellbores may be re-designated as monitor wellbores. Thus, the present disclosure contemplates that a "monitor wellbore" (such as monitor wellbore 108a) may, at some point in time, become a "treatment wellbore" (like treatment wellbore 106) and vice versa. For instance, in a zipper frac process, the treatment wellbore 106 may, at some point during the process, become a monitor wellbore while monitor wellbore 108a becomes a treatment wellbore to form the fractures 110. Thus, while not shown in FIGS. 1A-1C, a pressure sensor may be positioned in the treatment wellbore 106 (e.g., at a wellhead of the treatment wellbore 106) to measure pressure responses during a fracturing treatment process in monitor wellbore 108a.

The example hydraulic fracturing system 100 includes a hydraulic fracturing liquid circulation system 118 (i.e., a frac spread) that is fluidly coupled to the treatment wellbore 106. In some aspects, the hydraulic fracturing liquid circulation system 118, which includes one or more pumps 116, is fluidly coupled to the subterranean formation 104 (which could include a single formation, multiple formations or portions of a formation) through a working string (not shown). Generally, the hydraulic fracturing liquid circulation system 118 can be deployed in any suitable environment, for example, via skid equipment, a marine vessel, sub-sea deployed equipment, or other types of equipment and include hoses, tubes, fluid tanks or reservoirs, pumps, valves, and/or other suitable structures and equipment arranged to circulate a hydraulic fracturing liquid through the treatment wellbore 106 and into the subterranean formations 104a-104c to generate the one or more fractures 112. The working string is positioned to communicate the hydraulic fracturing liquid into the treatment wellbore 106 and can include coiled tubing, sectioned pipe, and/or other structures that communicate fluid through the wellbore 106. The working string can also include flow control devices, bypass valves, ports, and or other tools or well devices that control the flow of fracturing fluid from the interior of the working string into the subterranean formations 104a-104c.

Generally, a fracture treatment (or "treatment") includes operating one or more pumps to circulate and force a hydraulic fracturing liquid (that may or may not include proppant) through a wellbore (such as treatment wellbore 106) and into a subterranean formation at a pressure sufficient to fracture the formation. Typically, fracture treatments are staged, such that portions of the wellbore are sequentially staged to fracture adjacent portions of the subterranean formation. For example, in some aspects, a selected portion of the wellbore may be fluidly isolated from other portions of the wellbore (e.g., through one or more wellbore seals, such as packers), while the hydraulic fracturing fluid is circulated to the selected portion to fracture the subterranean formation adjacent that selected portion. A treatment, in some aspects, begins at a time instant (a "treatment start time") in which the one or more pumps begin to circulate the hydraulic fracturing fluid into the treatment wellbore and ends at a time instance in which the one or more pumps are stopped or turned off (a "treatment end time"). Even after the treatment end time, however, the hydraulic fracturing fluid may continue to circulate for some time period, both through the treatment wellbore and into the subterranean formation. Thus, in some aspects, one or more pressure sensors positioned in or at monitor wellbores (such as monitor wellbore 108a-108c) may sense a change in pressure (a "pressure response") during the fracture treatment (between treatment start time and treatment end time) in the treatment wellbore as well as subsequent to the treatment end time.

Although labeled as a terranean surface 102, this surface may be any appropriate surface on Earth (or other planet) from which drilling and completion equipment may be staged to recover hydrocarbons from a subterranean zone. For example, in some aspects, the surface 102 may represent a body of water, such as a sea, gulf, ocean, lake, or otherwise. In some aspects, all are part of a drilling and completion system, including hydraulic fracturing system 100, may be staged on the body of water or on a floor of the body of water (e.g., ocean or gulf floor). Thus, references to terranean surface 102 includes reference to bodies of water, terranean surfaces under bodies of water, as well as land locations.

Subterranean formations 104a-104c may include one or more rock or geologic formations that bear hydrocarbons (e.g., oil, gas) or other fluids (e.g., water) to be produced to the terranean surface 102. For example, the rock or geologic formations can be shale, sandstone, or other type of rock, typically, that may be hydraulically fractured to produce or enhance production of such hydrocarbons or other fluids. In some aspects, one or more of the subterranean formations 104a-104c comprise different rock formations (e.g., shales, sandstones, or otherwise). In some aspects, one or more of the subterranean formations 104a-104c comprise similar rock formations (e.g., shales, sandstones, or otherwise) but in distinct layers represented by the formations 104a-104c (e.g., upper layer, lower layer).

As shown specifically in FIG. 1C, the monitor fractures 110 emanating from the monitor wellbore 108a and the treatment fractures 112 emanating from the treatment wellbore 106 may extend past each other in the plane normal to (perpendicular to) the direction of minimum principal stress ($\sigma_2$) when formed. As shown in this example, wellbores are typically drilled in a direction that is as close as possible to the direction of minimum principle stress, such that hydraulic fractures propagate away from the wellbore and not along its trajectory. As shown, when projected to a two dimensional space normal to the direction of minimum principal stress (e.g. the $\sigma_1$-$\sigma_3$ plane) such fractures overlap in the plane, though they may be separated by significant distance in the direction of $\sigma_2$. Further, in some aspects, monitor fractures 110 and treatment fractures 112 (as well as monitor wellbores and treatment wellbores) may be rotated relative to each other as the relationship between $\sigma_1$, $\sigma_2$, and as changes along a wellbore. As shown in this figure, a set of rock stress axes are illustrated, with the overburden stress, $\sigma_1$, in the same direction as the z-axis. A minimum principal stress, $\sigma_2$, and a maximum principal stress, $\sigma_3$, are offset 900 from each other. The induced stress field about a newly formed hydraulic fracture is highly non-linear, and while general statements may be made about the magnitude of this induced stress field being related to proximity to the hydraulic fracture—no simple relationship can be assumed relating it to proximity in the direction of minimum principal stress, nor to "overlap" in the plane normal to the direction of minimum principal stress.

FIG. 1C illustrates an example implementation in which the monitor and treatment wellbores 108a-108c and 106, respectively, are formed in a "wine-rack" configuration. In some aspects, implementations of the present disclosure that determine one or more FDIs between the illustrated wellbores may more accurately determine such FDIs in wellbores in a wine-rack formation as compared to previous or conventional solutions.

In some aspects, data about the location of such fractures 110 and 112 and their respective wellbores 108a-108c and 106, such as locations of the wellbores, distances between the wellbores (e.g., in three dimensions) depth of horizontal portions of the wellbores, and locations of the hydraulic fractures initiated from the wellbores (e.g., based on perforation locations formed in the wellbores), among other information may be stored and processed. In some aspects, such information (along with the monitored, induced pressure variations in a fluid in the one or more monitor wellbores) may be used to help determine one or more FDIs between the illustrated wellbores.

Fracture driven interactions (FDIs) between wellbores, according to example implementations of the present disclosure, may be quantitatively classified, qualitatively classified, or both quantitatively and qualitatively classified according to, for example, pressure responses measured in one or more monitor wellbores (e.g., by pressure sensors 114 in monitor wellbores 108a-108c). In some examples, FDIs may be classified (as described in more detail later) into one or more separate classifications. An example classification of a fracture driven interaction (FDI) between two or more wellbores may be a direct fluid communication. In a direct fluid communication, with reference to FIGS. 1A-1C, one or more of the treatment fractures 112 (alone or in combination with natural fractures, or faults, or both) establish direct fluid communication with one or more monitor fractures 110, one or more monitor wellbores 108a-108c. The direct fluid communication that is established is due to a path of the treatment fracture 112 crossing a path of the monitor fracture 110 and/or one or more of the monitor wellbores 108a-108c. In some aspects, a direct fluid communication may be considered to be a plane (i.e., the treatment fracture) that acts as a high permeability path for the hydraulic fracturing fluid circulating into the treatment wellbore to travel directly to the monitor wellbore (in some cases, through a monitor fracture).

Another example FDI between two or more wellbores may be a fluid migration. In a fluid migration, a change in fluid pressure in the low permeable fracture network and surrounding the primary hydraulic fracture and reservoir pressure of the subterranean formation causes fluid in the subterranean formation to move into one or more monitor wellbores (in some cases, through one or more monitor fractures). Thus, fluid migration is different than a direct fluid communication in that in fluid migration, hydraulic fracturing fluid circulating into the treatment wellbore causes fluid to move through the formation in a volumetric manner (as opposed to direct or planar) by utilizing a network of low permeable fractures to move fluid away from the treatment wellbore and thus indirectly towards the monitor wellbore. A fluid migration FDI can be on a time scale of several hours (e.g., 1-3 hours approximately) rather than, for example, a time scale of seconds, days, weeks, or longer.

Another example FDI between two or more wellbores may be a poroelastic response (also referred to as an undrained rock compression interaction). In some aspects, a poroelastic response FDI represents a recordable change in pressure of a fluid in a monitor wellbore (and in some cases a monitor fracture) that is caused by a change in stress on a solid in a subsurface formation that is in contact with a formation fluid (e.g., a hydrocarbon fluid or brine or other formation fluid), which is in direct fluid communication with the fluid in the monitor wellbore. The change in stress of the solid is caused by the hydraulic fracturing fluid circulated into a treatment wellbore and subsequently into the subterranean formation through one or more treatment fractures. Unlike a direct fluid communication FDI, a poroelastic response FDI involves no fluid movement or transport. For instance, in a poroelastic response FDI, all fluid stays in place relative to its original position in the rock (solid). The pressure change is caused by a deformation (volumetric change) of the solid rock together with its fluid content. In the case of a volumetric decrease (compression) the fluid pressure will increase. Thus, it is the change in stress on the rock (in the subterranean zone) in contact with the hydraulic fracturing fluid in the treatment fractures 112 that causes a change in pressure in the fluids in the one or more monitor wellbores (and in some cases monitor fractures), which can be measured as a pressure-induced poromechanic signal (i.e., a poroelastic response) by one or more pressure sensors in the monitor wellbore(s).

Another example FDI between two or more wellbores may be a null response. Generally, a null response refers to no recordable pressure change in one or more of the pressure sensors 114 in the one or more monitor wellbores 108a-108c during (or after) a treatment is conducted in the treatment wellbore 106.

Figure 2:
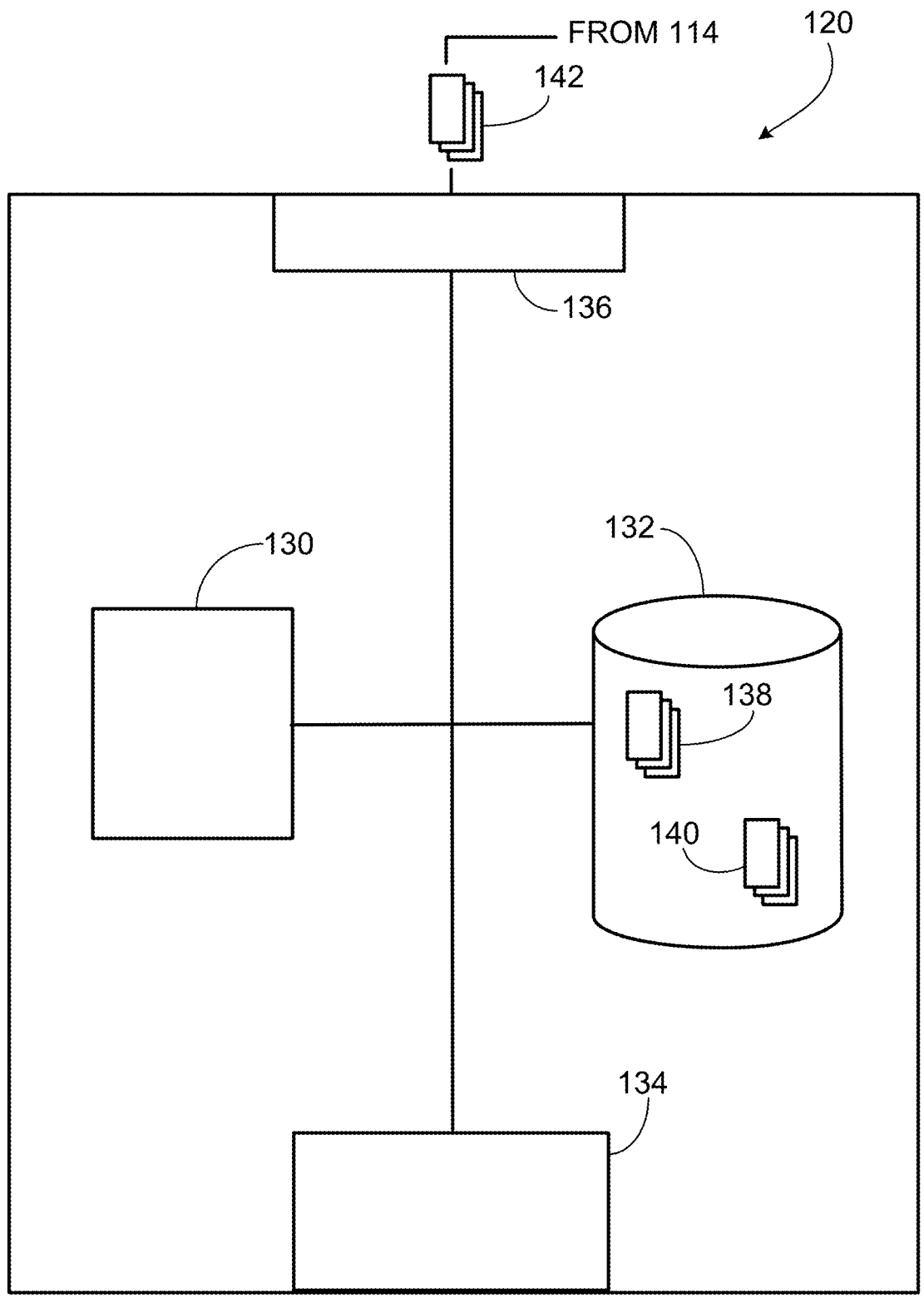
FIG. 2 is a schematic diagram of a structured data processing system that implements the hydraulic fracturing modeling system.

FIG. 2 is a schematic diagram of a computing system that implements the hydraulic fracturing modeling system 120 (structured data processing system) shown in FIGS. 1A-1C. Although illustrated as connected to the wellbore 108a only, generally, the hydraulic fracturing modeling system 120 is capable of receiving or obtaining data from or related to any of the monitor wellbores 108*a*-108*c* (and pressure sensors 114 associated with each of these wellbores). Generally, the hydraulic fracturing modeling system 120 includes a processor-based control system operable to implement one or more operations described in the present disclosure. As shown in FIG. 2, pressure signal values 142 may be received at the hydraulic fracturing modeling system 120 from one or more pressure sensors 114 that is fluidly coupled to or in one or more of the monitor wellbores 108*a*-108*c*. The pressure signal values 142, in some aspects, may represent pressure variations in a fluid that is enclosed or contained in one or more of the monitor wellbores 108*a*-108*c* (and/or the hydraulic fractures 110) that are induced by a hydraulic fracturing fluid being used to form hydraulic fractures 112 from the treatment wellbore 106.

The hydraulic fracturing modeling system 120 may be any computing device operable to receive, transmit, process, and store any appropriate data associated with operations described in the present disclosure. The illustrated hydraulic fracturing modeling system 120 includes hydraulic fracturing modeling application 130. The application 130 is any type of application that allows the hydraulic fracturing modeling system 120 to request and view content on the hydraulic fracturing modeling system 120. In some implementations, the application 130 can be and/or include a web browser. In some implementations, the application 130 can use parameters, metadata, and other information received at launch to access a particular set of data associated with the hydraulic fracturing modeling system 120. Further, although illustrated as a single application 130, the application 130 may be implemented as multiple applications in the hydraulic fracturing modeling system 120.

The illustrated hydraulic fracturing modeling system 120 further includes an interface 136, a processor 134, and a memory 132. The interface 136 is used by the hydraulic fracturing modeling system 120 for communicating with other systems in a distributed environment—including, for example, the pressure sensor 114—that may be connected to a network. Generally, the interface 136 comprises logic encoded in software and/or hardware in a suitable combination and operable to communicate with, for instance, the pressure sensor(s) 114, a network, and/or other computing devices. Such systems are often referred to in practice as data "historians." More specifically, the interface 136 may comprise software supporting one or more communication protocols associated with communications such that a network or interface's hardware is operable to communicate physical signals within and outside of the hydraulic fracturing modeling system 120.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, Python, .NET, Matlab, any suitable version of 4GL, as well as others. While portions of the software illustrated in FIG. 2 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The processor 134 executes instructions and manipulates data to perform the operations of the hydraulic fracturing modeling system 120. The processor 134 may be a central processing unit (CPU), a blade, an application specific integrated circuit (ASIC), a field-programmable gate array (FPGA), graphics processing unit (GPU), or another suitable component. Generally, the processor 134 executes instructions and manipulates data to perform the operations of the hydraulic fracturing modeling system 120.

Although illustrated as a single memory 132 in FIG. 2, two or more memories may be used according to particular needs, desires, or particular implementations of the hydraulic fracturing modeling system 120. In some implementations, the memory 132 is an in-memory database. While memory 132 is illustrated as an integral component of the hydraulic fracturing modeling system 120, in some implementations, the memory 132 can be external to the hydraulic fracturing modeling system 120. The memory 132 may include any memory or database module and may take the form of volatile or non-volatile memory including, without limitation, magnetic media, optical media, random access memory (RAM), read-only memory (ROM), removable media, or any other suitable local or remote memory component. The memory 132 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the hydraulic fracturing modeling system 120.

The illustrated hydraulic fracturing modeling system 120 is intended to encompass any computing device such as a desktop computer, laptop/notebook computer, wireless data port, smart phone, smart watch, wearable computing device, personal data assistant (PDA), tablet computing device, one or more processors within these devices, or any other suitable processing device. For example, the hydraulic fracturing modeling system 120 may comprise a computer that includes an input device, such as a keypad, touch screen, or other device that can accept user information, and an output device that conveys information associated with the operation of the hydraulic fracturing modeling system 120 itself, including digital data, visual information, or a GUI.

As illustrated in FIG. 2, the memory 132 stores structured or unstructured (e.g. raw text files with no predefined taxonomy) data, including pressure response data 138 received from the one or more pressure sensors 114 in the monitor wellbores 108*a*-108*c* prior to, during, and subsequent to a hydraulic fracturing treatment process executed in the treatment wellbore 106. In some aspects, the pressure response data 138 includes time dependent pressure change values; in other words, a change in pressure at a particular time. In some aspects, the particular time is relative to the treatment start, or the treatment end, or both. In some aspects, the change in pressure comprises a pressure value relative to a trend line pressure, such as, for example, a pressure of the fluid in the monitor wellbore (and in some cases, monitor fracture) at a time distant enough from the treatment start (e.g., prior to) and the treatment end (e.g., subsequent to) such that no effects of the treatment are recordable. In some aspects, a trend line pressure is an estimation of a pressure of the fluid in a particular monitor wellbore that would have been recorded absent a hydraulic fracture being formed from the treatment wellbore at a particular time. As further explained in more detail, the hydraulic fracturing modeling system 120, and more particularly the hydraulic fracturing modeling application 130, may manipulate or otherwise use the pressure response data 138, as well as other data described herein, to determine one or more FDIs between the one or more wellbores in the hydraulic fracturing system 100.

Figure 3:
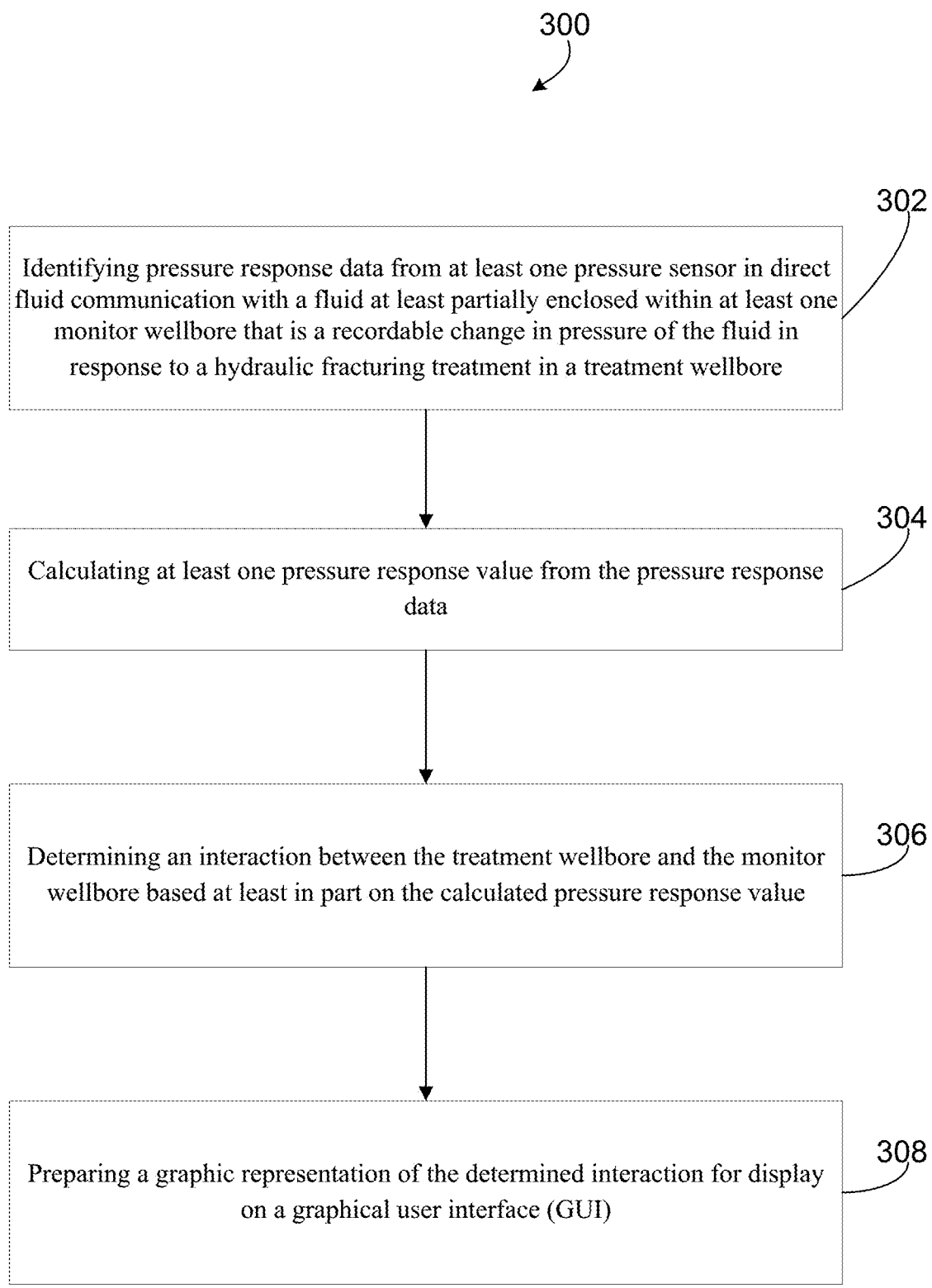
FIG. 3 is a flowchart that describes an example method for determining FDIs between two or more wellbores.

FIG. 3 is a flowchart that describes an example method 300 for determining features of a hydraulic fracture with a hydraulic fracturing modeling system, such as hydraulic fracturing modeling system 120 shown in FIGS. 1A-1C and 2. Method 300 may begin at step 302, which includes identifying pressure response data from at least one pressure sensor in direct fluid communication with a fluid at least partially enclosed within at least one monitor wellbore that is a recordable change in pressure of the fluid in response to a hydraulic fracturing treatment in a treatment wellbore. For example, as shown in FIGS. 1A-1C, monitor wellbores 108a-108c include pressure sensors 114, each of which is in direct fluid communication with a fluid enclosed within the particular monitor wellbore 108a-108c (and in the case of monitor wellbore 108a, monitor fractures 110). One or more of the pressure sensors 114 records (e.g., over a time duration) pressure of the fluid enclosed within the particular monitor wellbore 108a-108c (and in the case of monitor wellbore 108a, monitor fractures 110). The treatment wellbore 106 is also formed from the terranean surface 102 into one or more subterranean formations 104a-104c. A hydraulic fracturing treatment process may be initiated and completed (one or multiple times) with the frac spread 118 and pump 116. The hydraulic fracturing treatment process (or treatment) begins at a treatment start time when the pump 116 begins to circulate a hydraulic fracturing fluid into the treatment wellbore 106 and ends at a treatment end time when the pump 116 stops or is shut off (and the treatment wellbore 106 is shut in). As the treatment is ongoing (e.g., between treatment start time and treatment end time) and subsequent to the treatment, the pressure sensor(s) 114 record a change in the pressure of the fluid in the monitor wellbore(s) 108a-108c. Such pressure recordings may be stored, at least transiently, in the memory 132.

Other data may also be recorded and stored in the memory 132, such as, for example: treatment start time, treatment end time, treatment duration, treatment fluid pressure in time, maximum treatment fluid pressure, a trend line (or baseline) pressure in the fluid, and other data. The trend line pressure data may include, for example, pressure recordings of the pressure sensor(s) 114 during time periods outside of the treatment time duration in which the pressure recordings are largely or completely unaffected by the treatment.

Method 300 may continue at step 304, which includes calculating at least one pressure response value from the pressure response data. For example, a pressure response value may be a value or multiple values that are calculated based on the pressures recorded by the pressure sensor(s) 114 of the fluid in the monitor wellbore(s) 108a-108c during and after the treatment. In some aspects, each pressure response value is a dimensionless value between 0 and 1 that, in some aspects, represents a ratio of pressures. In some aspects, however, a pressure response value can be a single pressure value, such as a pressure measurement from a pressure sensor 114. Alternatively, in some aspects, a pressure response value can be a ratio of single pressure values, such as a ratio of pressure measurements from a pressure sensor 114. Alternatively, in some aspects, a pressure response value can be a pressure differential value, such as a pressure difference between a measured pressure from a pressure sensor 114 and a trend line pressure.

In this example implementation of method 300 however, as described, the pressure response value is a dimensionless value between 0 and 1 that represents a ratio of pressures and, more specifically, a ratio of pressure differentials. For example, in an example implementation, the pressure response value is a ratio of a change in pressure of the fluid relative to the trend line pressure at the treatment end time to a change in pressure of the fluid relative to the trend line pressure at a rollover time subsequent to the treatment end time. In some aspects, the "rollover" time is a time subsequent to the treatment end time in which a pressure curve of the recorded pressure of the fluid is parallel to a pressure curve of the trend line pressure. Thus, in some aspects, the rollover time is a time subsequent to the treatment end time in which a slope of the pressure curve of the recorded pressure of the fluid is equal or substantially equal to a slope of the pressure curve of the trend line pressure. This example ratio may be illustrated in the following equation:

$$PRV = \max\left(\text{minutes}(\Delta t_{rollover}) \frac{\Delta P_{rollover}}{\Delta P_{shut\ in}}, 1\right);$$

where PRV is the pressure response value; $\Delta P_{shut\ in}$ is the change in pressure of the fluid relative to the trend line pressure at the treatment end time, $\Delta P_{rollover}$ is the change in pressure of the fluid relative to the trend line pressure at a rollover time subsequent to the treatment end time and $\Delta t_{rollover}$ is the elapse time in expressed in minutes from end of treatment to a rollover time. In some aspects, as noted, the PRV is a dimensionless, positive number with a maximum value of 1 (i.e., between 0 and 1).

In some aspects, a particular pressure response value may be calculated for each monitor wellbore (e.g., for each monitor wellbore 108a-108c) in which a recordable pressure change is identified due to a treatment process in a treatment wellbore (e.g., treatment wellbore 106).

Method 300 may continue at step 306, which includes determining an FDI between the treatment wellbore and the monitor wellbore based at least in part on the calculated pressure response value. For example, as previously described, there may be one or more types or classifications of FDIs between two or more wellbores. Example FDIs include a direct fluid communication, a fluid migration, a poroelastic response, and a null response. In some aspects, the FDI is between the treatment wellbore 106 and one or more of the monitor wellbores 108a-108c (and in some cases, the monitor fractures 112) or even between the treatment wellbore 106 and each of the monitor wellbores 108a-108c. Thus, step 306 includes determining whether an FDI between the treatment wellbore 108 and each monitor wellbore 108a-108c is a direct fluid communication, a fluid migration, a poroelastic response, or a null response.

In some aspects, determining the FDI includes determining the value of the pressure response value between 0 and 1. For example, in some aspects, determining that the time to rollover value is between 0.5 and 1 (and in some aspects, between 0.7 and 1) means that the FDI may be a fluid migration FDI between the treatment wellbore and the particular monitor wellbore. In some aspects, determining that the time to rollover value is between 0 and 0.5 (and in some aspects, between 0 and 0.3) means that the FDI may be a direct fluid communication FDI between the treatment wellbore and the particular monitor wellbore. In some aspects, determining that the pressure response value is 0 and 0.5 (and particularly close to 0) means that the FDI may be a poroelastic response FDI between the treatment wellbore and the particular monitor wellbore.

In some aspects, step 306 further includes determining an FDI between the treatment wellbore and the monitor wellbore based at least in part on the calculated pressure response value as well as a maximum pressure change in the fluid over one or more particular time durations that fall within the treatment time duration (e.g., between the treatment start time and the treatment end time). For example, in some aspects, such as to further distinguish between a direct fluid communication FDI and a poroelastic response FDI, criteria in addition to the pressure response value may be used in step 306.

For example, in some aspects, a maximum pressure over each of two time durations, such as a short time duration and a long time duration, within the treatment time duration, is calculated. A first, or short, time duration may be about 60 seconds within the treatment time duration. Therefore, within the treatment time duration, whichever window of the 60 seconds (or other selected short time duration) in which the maximum or highest pressure change of the fluid in the monitor wellbore is recorded may be used as a short time duration maximum pressure increase.

Similarly, a second, or long, time duration may be about 10 minutes within the treatment time duration. Therefore, within the treatment time duration, whichever window of the 10 minutes (or other selected long time duration) in which the maximum or highest pressure change of the fluid in the monitor wellbore is recorded may be used as a long time duration maximum pressure increase.

In some aspects, as part of step 306 (or another step), one or both of the short time duration maximum pressure increase or the long time duration maximum pressure increase may be compared against a total pressure increase of the fluid in the monitor wellbore between the treatment start time and the treatment end time. In some aspects, therefore, the FDI between the two or more wellbores may consider both the value of the pressure response value as well as at least one of the short time duration maximum pressure increase or the longtime duration maximum pressure increase relative to the total pressure increase of the fluid in the monitor wellbore between the treatment start time and the treatment end time.

Figure 4A:
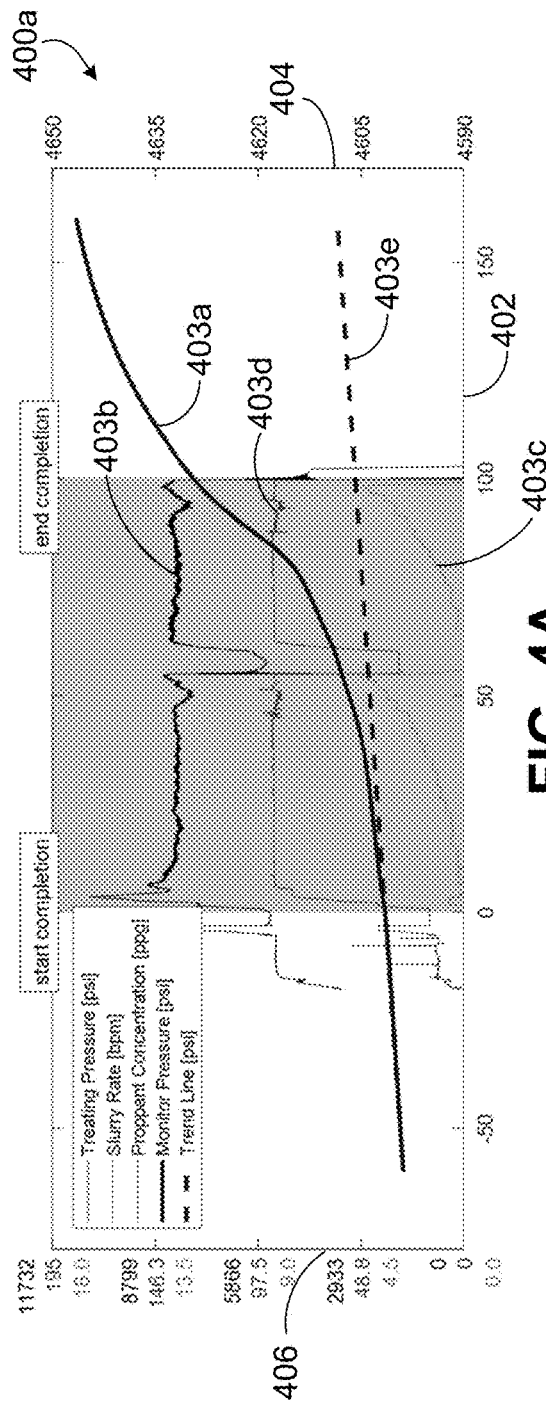
Figure 4B:
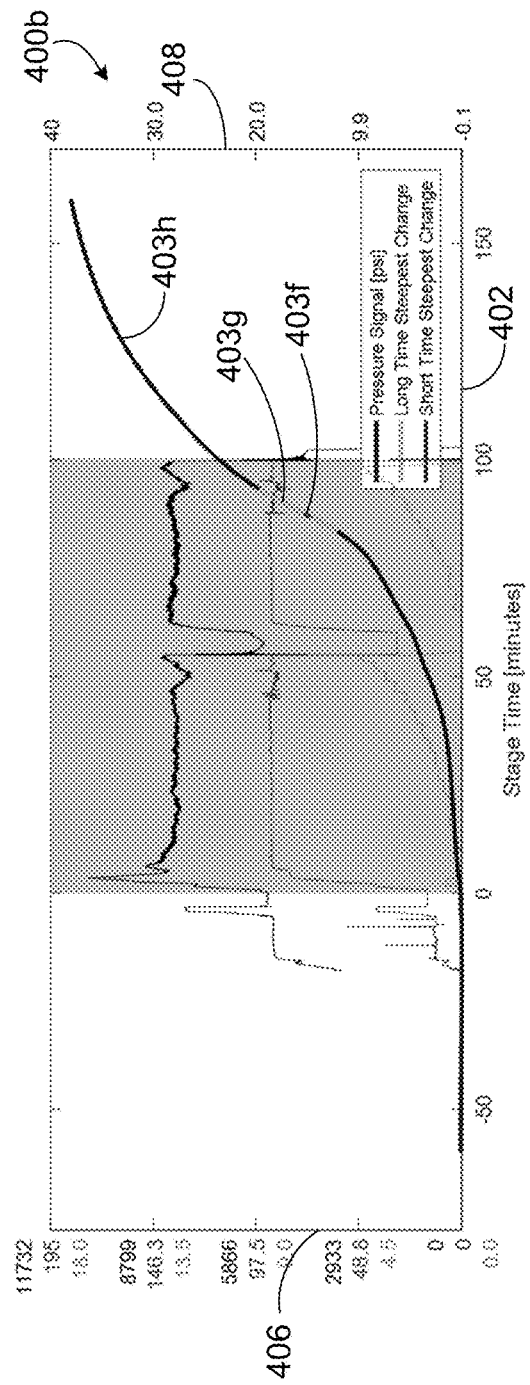

In some aspects, when the pressure response value is between 0.5 and 1 (and in some aspects, between 0.7 and 1) and at least one of: (i) the short time duration maximum pressure increase being about 5% or less of the total pressure increase of the fluid in the monitor wellbore; or (ii) the long time duration maximum pressure increase being about 30% or less of the total pressure increase of the fluid in the monitor wellbore means that the FDI may be the fluid migration FDI between the treatment wellbore and the particular monitor wellbore. For example, FIG. 4A shows graph 400a while FIG. 4B shows graph 400b. Each of the graphs 400a and 400b illustrate one or more pressure vs. time curves. As shown in the graphs 400a and 400b, axis 402 represents a time range (in minutes) for a fracturing stage in a treatment wellbore. The axis 404 represents a pressure range (in psi) for a monitor pressure curve 403a that represents raw pressure signal data from a pressure sensor fluidly coupled to a monitor wellbore. The axis 406 represents a pressure range (in psi) for a treating pressure curve 403b, a barrel per minute range of a slurry rate of a hydraulic fracturing fluid used in the treatment wellbore 403c, and a pound per gallon proppant concentration of the hydraulic fracturing fluid used in the treatment wellbore 403d. As shown in the graph 400a, a trend line 403e is also estimated.

Regarding the graph 400b, the axis 408 represents a pressure range (in psi) for a monitor pressure curve 403h that represents raw pressure signal data from a pressure sensor fluidly coupled to a monitor wellbore less the trend line value on a time basis. The graph 400b further shows a max pressure change over a short time duration 403f (portion of 403h) and a max pressure change over a long time duration 403g (portion of 403h). The graphs 400a and 400b based on at least the determined RPV, and in some aspects, the max pressure change over the short time duration and the max pressure change over the long time duration represents a fluid migration FDI between the treatment wellbore and the particular monitor wellbore.

Figure 4C:
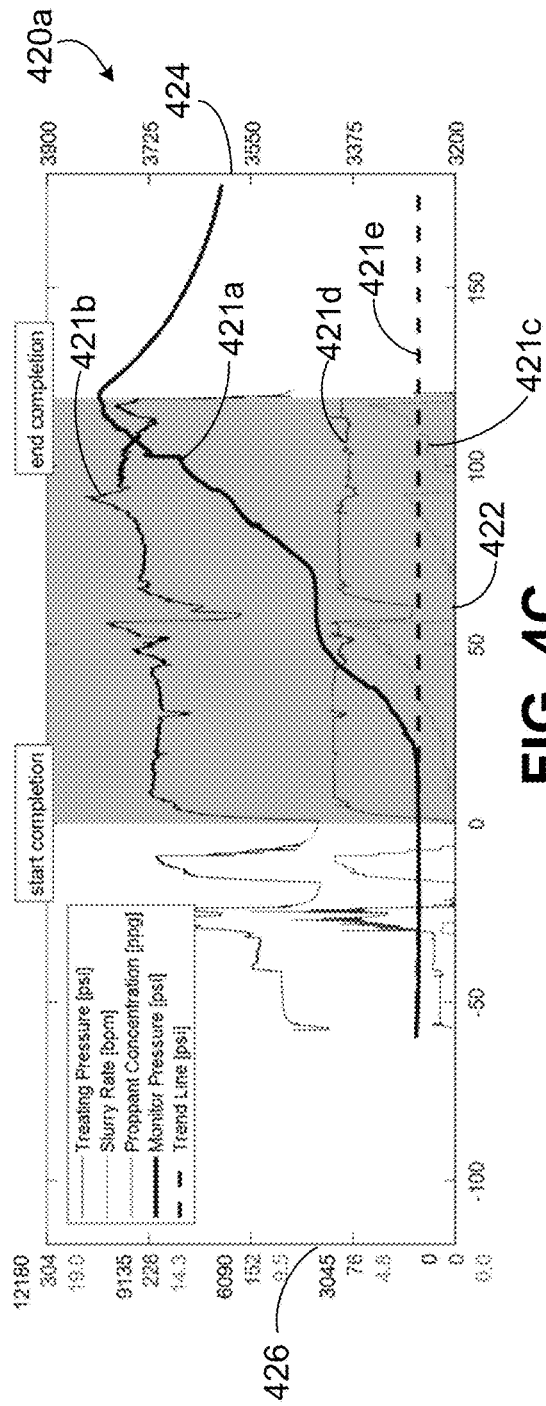
Figure 4D:
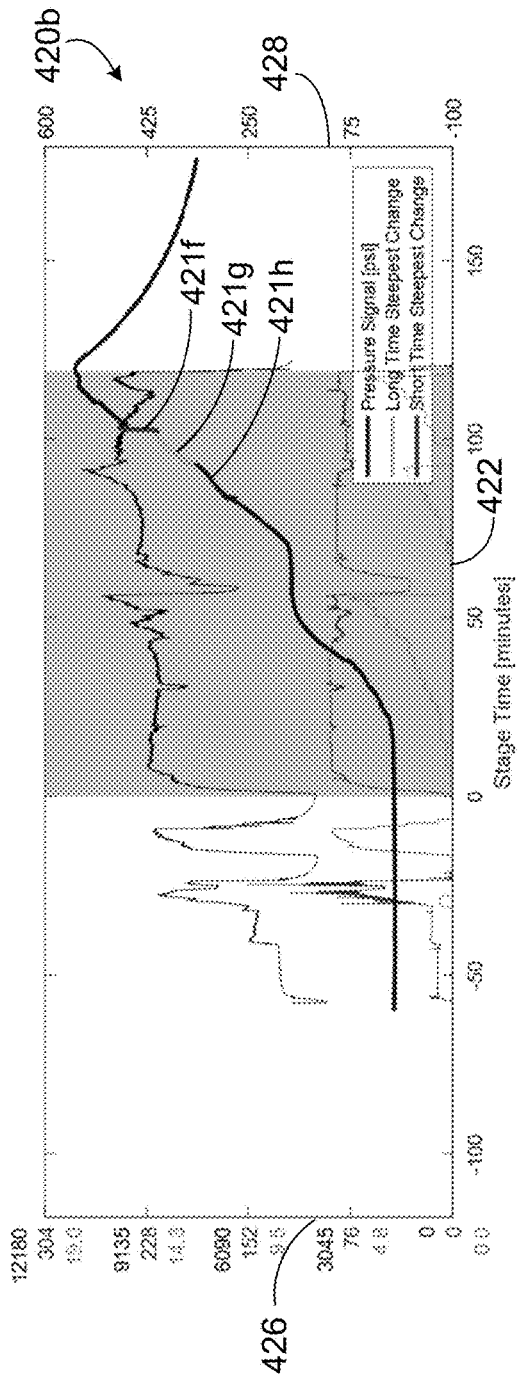

In some aspects, when the pressure response value is between 0 and 0.5 (and in some aspects, between 0 and 0.3) and at least one of: (i) the short time duration maximum pressure increase being more than 5% of the total pressure increase of the fluid in the monitor wellbore; or (ii) the long time duration maximum pressure increase being more than 30% of the total pressure increase of the fluid in the monitor wellbore means that the FDI may be the direct fluid communication FDI between the treatment wellbore and the particular monitor wellbore. For example, as shown in FIGS. 4C-4D, graphs 420a and 420b are illustrated. Each of the graphs 420a and 420b illustrate one or more pressure vs. time curves. As shown in the graphs 420a and 420b, axis 422 represents a time range (in minutes) for a fracturing stage in a treatment wellbore. The axis 424 represents a pressure range (in psi) for a monitor pressure curve 421a that represents raw pressure signal data from a pressure sensor fluidly coupled to a monitor wellbore. The axis 426 represents a pressure range (in psi) for a treating pressure curve 421b, a barrel per minute range of a slurry rate of a hydraulic fracturing fluid used in the treatment wellbore 421c, and a pound per gallon proppant concentration of the hydraulic fracturing fluid used in the treatment wellbore 421d. As shown in the graph 420a, a trend line 421e is also estimated. Regarding the graph 420b, the axis 428 represents a pressure range (in psi) for a monitor pressure curve 421h that represents raw pressure signal data from a pressure sensor fluidly coupled to a monitor wellbore less the trend line value on a time basis. The graph 420b further shows a max pressure change over a short time duration 421f (portion of 421h) and a max pressure change over a long time duration 421g (portion of 421h). The graphs 420a and 420b based on at least the determined RPV, and in some aspects, the max pressure change over the short time duration and the max pressure change over the long time duration represents a direct fluid communication FDI between the treatment wellbore and the particular monitor wellbore.

In some aspects, when the pressure response value is between 0 and 0.5 (and in some aspects, close to 0) and at least one of: (i) the short time duration maximum pressure increase being about 5% or less of the total pressure increase of the fluid in the monitor wellbore; or (ii) the long time duration maximum pressure increase being about 30% or less of the total pressure increase of the fluid in the monitor wellbore means that the FDI may be the poroelastic response FDI between the treatment wellbore and the particular monitor wellbore. For example, as shown in FIGS. 4E-4F, graphs 440a and 440b are illustrated. Each of the graphs 440a and 440b illustrate one or more pressure vs. time curves. As shown in the graphs 440a and 440b, axis 442 represents a time range (in minutes) for a fracturing stage in a treatment wellbore. The axis 444 represents a pressure range (in psi) for a monitor pressure curve 441a that represents raw pressure signal data from a pressure sensor fluidly coupled to a monitor wellbore. The axis 446 represents a pressure range (in psi) for a treating pressure curve 441*b*, a barrel per minute range of a slurry rate of a hydraulic fracturing fluid used in the treatment wellbore 441*c*, and a pound per gallon proppant concentration of the hydraulic fracturing fluid used in the treatment wellbore 441*d*. As shown in the graph 440*a*, a trend line 441*e* is also estimated. Regarding the graph 440*b*, the axis 448 represents a pressure range (in psi) for a monitor pressure curve 441*h* that represents raw pressure signal data from a pressure sensor fluidly coupled to a monitor wellbore less the trend line value on a time basis. The graph 440*b* further shows a max pressure change over a short time duration 441*f* (portion of 441*h*) and a max pressure change over a long time duration 441*g* (portion of 441*h*). The graphs 440*a* and 440*b* based on at least the determined RPV, and in some aspects, the max pressure change over the short time duration and the max pressure change over the long time duration represents a poroelastic response FDI between the treatment wellbore and the particular monitor wellbore.

Method 300 may continue at step 308, which includes preparing a graphic representation of the determined FDI for display on a graphical user interface (GUI). For example, the determined FDI may be graphically or textually presented to a user on the GUI for further decisions or considerations.

Method 300 may include further steps as well. For example, a determination that the FDI is a direct fluid communication FDI may mean that some proppant within the treatment fluid (e.g., the hydraulic fracturing fluid used in the treatment wellbore 106) has been washed out and does not remain in the hydraulic fractures 112. A direct fluid communication FDI may also mean that the hydraulic fractures 112 may have been damaged and unable to fully or partially produce a hydrocarbon fluid from the subterranean formation to the treatment wellbore 106. Thus, as a treatment is being performed on the treatment wellbore 106 and a determination that the FDI is a direct fluid communication is made during the treatment, action may be taken (e.g., to stop the treatment or otherwise) in real time as a further step of method 300.

As another example, a determination that the FDI is a fluid migration may mean that the treatment fracture and otherwise the wellbores within the wellbore system are adequately covering (e.g., positioned for good drainage) a reservoir without actually having a direct fluid communication FDI. Thus, as a treatment is being performed on the treatment wellbore 106 and a determination that the FDI is a fluid migration is made during the treatment, action may be taken (e.g., continuing the treatment or otherwise) in real time as a further step of method 300.

As another example, a determination that the FDI is a poroelastic response FDI may mean that the wellbores within the wellbore system are inadequately covering (e.g., positioned for less than ideal drainage) a reservoir. Further, in some aspects, the determination that the FDI is a poroelastic response FDI may mean that multiple landing zones (e.g., subterranean formations 104*a*-104*c*) may be independently developed if the wellbores land in such separate zones.

Figure 4G:
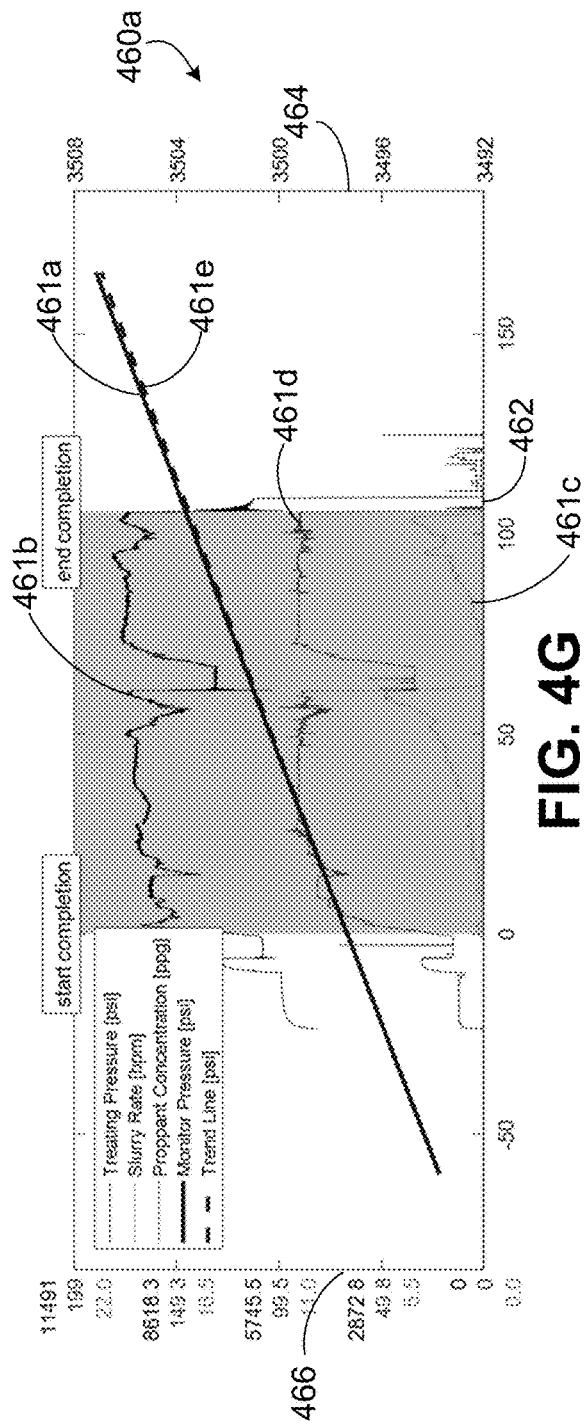
Figure 4H:
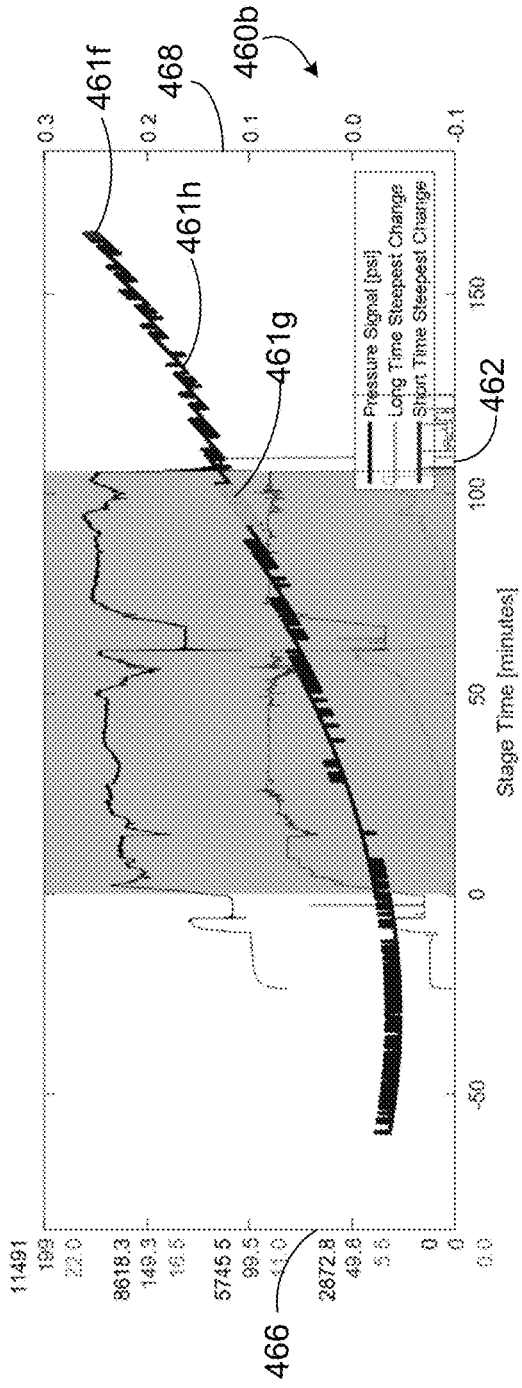

In the case of a null response FDI, however, such a determination may indicate that one or more pressure sensors 114 are not working properly or not in direct fluid communication with the fluid in their respective monitor wellbores 108*a*-108*c*. Thus, as a treatment is being performed on the treatment wellbore 106 and a determination that the FDI is a null response is made during the treatment, a further step of method 300 may be taken (e.g., checking the pressure sensors) in real time. As another example, a null response FDI (e.g., a pressure response that does not vary from a trend line pressure of a monitor wellbore) may indicate that the monitor wellbore is so far from the treatment wellbore as to not experience any recordable pressure change. Thus, a null response FDI may also indicate a need to drill more wells within a reservoir. For example, as shown in FIGS. 4G-4H, graphs 460*a* and 460*b* are illustrated. Each of the graphs 460*a* and 460*b* illustrate one or more pressure vs. time curves. As shown in the graphs 460*a* and 460*b*, axis 462 represents a time range (in minutes) for a fracturing stage in a treatment wellbore. The axis 464 represents a pressure range (in psi) for a monitor pressure curve 461*a* that represents raw pressure signal data from a pressure sensor fluidly coupled to a monitor wellbore. The axis 466 represents a pressure range (in psi) for a treating pressure curve 461*b*, a barrel per minute range of a slurry rate of a hydraulic fracturing fluid used in the treatment wellbore 461*c*, and a pound per gallon proppant concentration of the hydraulic fracturing fluid used in the treatment wellbore 461*d*. As shown in the graph 460*a*, a trend line 461*e* is also estimated. Regarding the graph 460*b*, the axis 468 represents a pressure range (in psi) for a monitor pressure curve 461*h* that represents raw pressure signal data from a pressure sensor fluidly coupled to a monitor wellbore less the trend line value on a time basis. The graph 460*b* further shows a max pressure change over a short time duration 461*f* (portion of 461*h*) and a max pressure change over a long time duration 461*g* (portion of 461*h*). The graphs 460*a* and 460*b* based on at least the determined RPV, and in some aspects, the max pressure change over the short time duration and the max pressure change over the long time duration represents a null response between the treatment wellbore and the particular monitor wellbore.

In method 300 (and FIGS. 4A-4H), a pressure response value is used to characterize and determine a FDI. In the example method 300 (and FIGS. 4A-4H), the pressure response value can be a determined pressure signal, such as a determined ratio of pressures based on particular measured pressures (in some aspects, relative to a trend line). The pressure response value, in this case, can also be called a "signal initiation." When quantifying the pressure response in the offset well (i.e., a treatment well), one of the metrics used is signal initiation. In other aspects, signal initiation can take the form of a monitored (or measured) pressure (i.e., directly from a pressure sensor 114). In other techniques, signal initiation can take the form of a first or second time derivative of a pressure signal, e.g., either $d\Delta P/dt$ or $d^2\Delta P/dt^2$, respectively.

In general, signal initiation is a moment in time (e.g., a timestamp) from which the impact of the offset (treatment) completion becomes significant on the pressure response in the monitor well. Often, the signal initiation is expressed as the cumulative (slurry) volume that has been pumped from the start of the stage until the moment (timestamp) in which the impact becomes significant. This concept can be referred to as "volume to first response" (VFR). The form of the signal initiation can be a design decision for the analysis workflow. In general, the signal initiation involves criteria set on a single time series or collection of time series. Time series that may be considered are direct pressure acquired from the monitor well (i.e., monitor or measured pressure) or time series derived from the direct pressure acquisition (i.e., the described pressure response value in the present disclosure or the first or second time derivatives from the pressure signal). The form of the signal initiation ultimately chosen for the analysis workflow (such as in method 300) can affect the accuracy of the determined moment in time from which the impact of the offset (treatment) completion becomes significant on the pressure response in the monitor well.

Figure 5A:
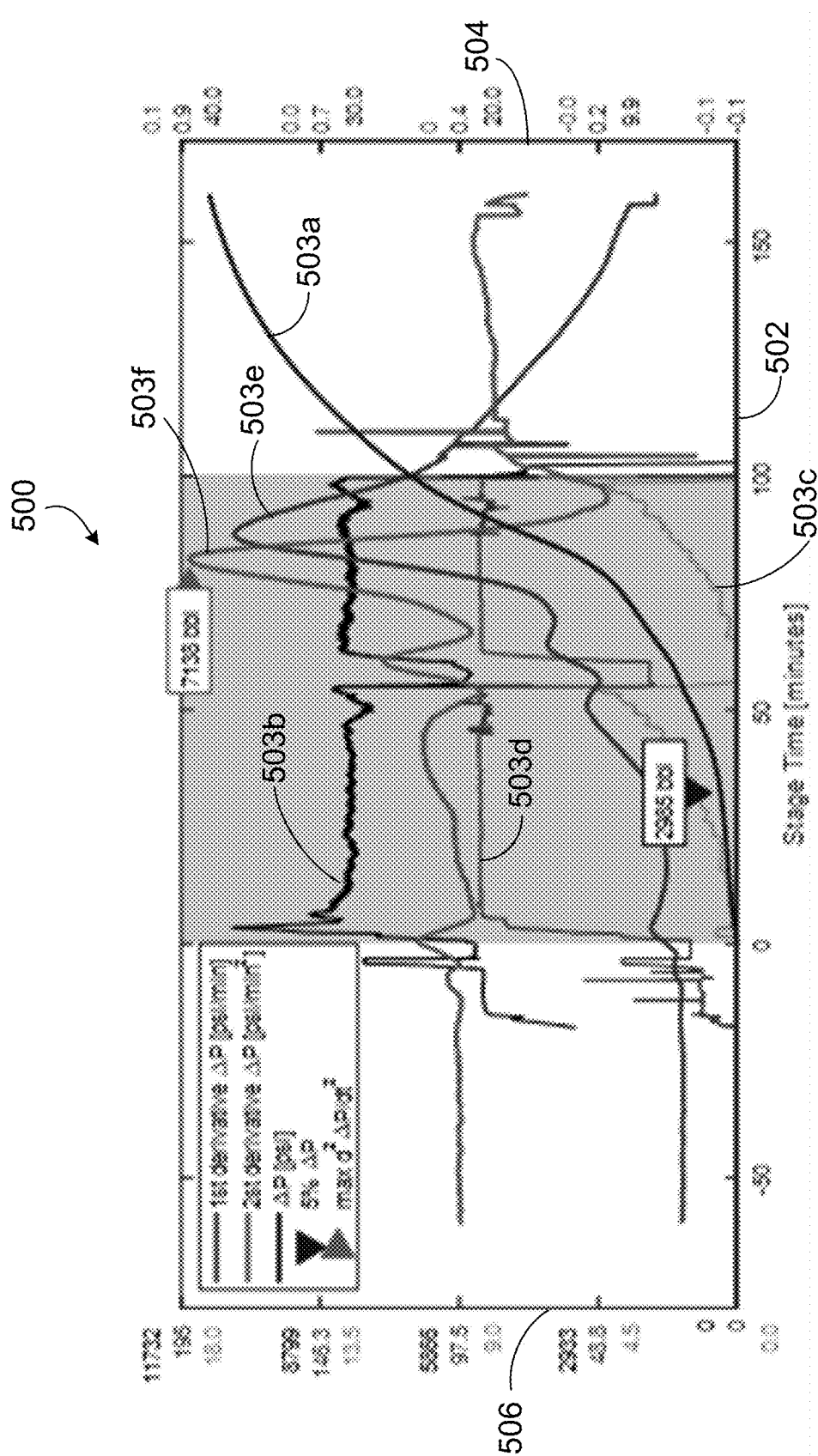
FIGS. 5A-5D illustrate charts that graphically illustrate pressure curves that qualitatively show FDIs between two or more wellbores according to different signal initiation forms.

For example, FIGS. 5A-5D show pressure vs. time curves that illustrate different determined moments in time from which the impact of the offset (treatment) completion becomes significant on the pressure response in the monitor well due to different forms of the signal initiation. FIG. 5A shows graph 500. Axis 502 represents a time range (in minutes) for a fracturing stage in a treatment wellbore. The axis 504 represents a pressure range (in psi) for a monitor pressure curve 503a that represents pressure signal data from a pressure sensor fluidly coupled to a monitor wellbore less a pressure trend value. The axis 506 represents a pressure range (in psi) for a treating pressure curve 503b, a barrel per minute range of a slurry rate of a hydraulic fracturing fluid used in the treatment wellbore 503c, and a pound per gallon proppant concentration of the hydraulic fracturing fluid used in the treatment wellbore 503d. Graph 500 also shows a first derivative curve 503e and a second derivative curve 503f (both being derivatives of the pressure curve 503a.

In case of the pressure curve 503a, the following criteria to define signal initiation can be used: the first moment in time after the start of completions for which a value on the pressure curve 503a exceeds 5% of the maximum pressure signal during stage completion time (e.g., between 0 and 100 minutes). For the example in graph 500, the end of completion pressure signal is 23.7 psi. The first time a value on the pressure curve 503a that exceeds 5% of that value is after 32.3 minutes or 2985 barrels of slurry. The following criteria to define signal initiation can alternatively be used: the first moment in time after the start of completions for which a peak value of the second derivative curve 503f. In graph 500, the point in time for which the peak of the second derivative curve 503f occurs is after 82.4 minutes or 7138 barrels of slurry. As shown in graph 500, different selections of the form of the signal initiation—here, value of pressure curve 503a exceeds 5% of maximum pressure signal during completion time or peak value of the second derivative curve 503f—can result in different moments in time at which signal initiation occurs (32.3 minutes vs. 82.4 minutes). Therefore, it is apparent that the chosen definition of signal initiation can significantly impact the actual time stamp or determined VFR.

Figure 5B:
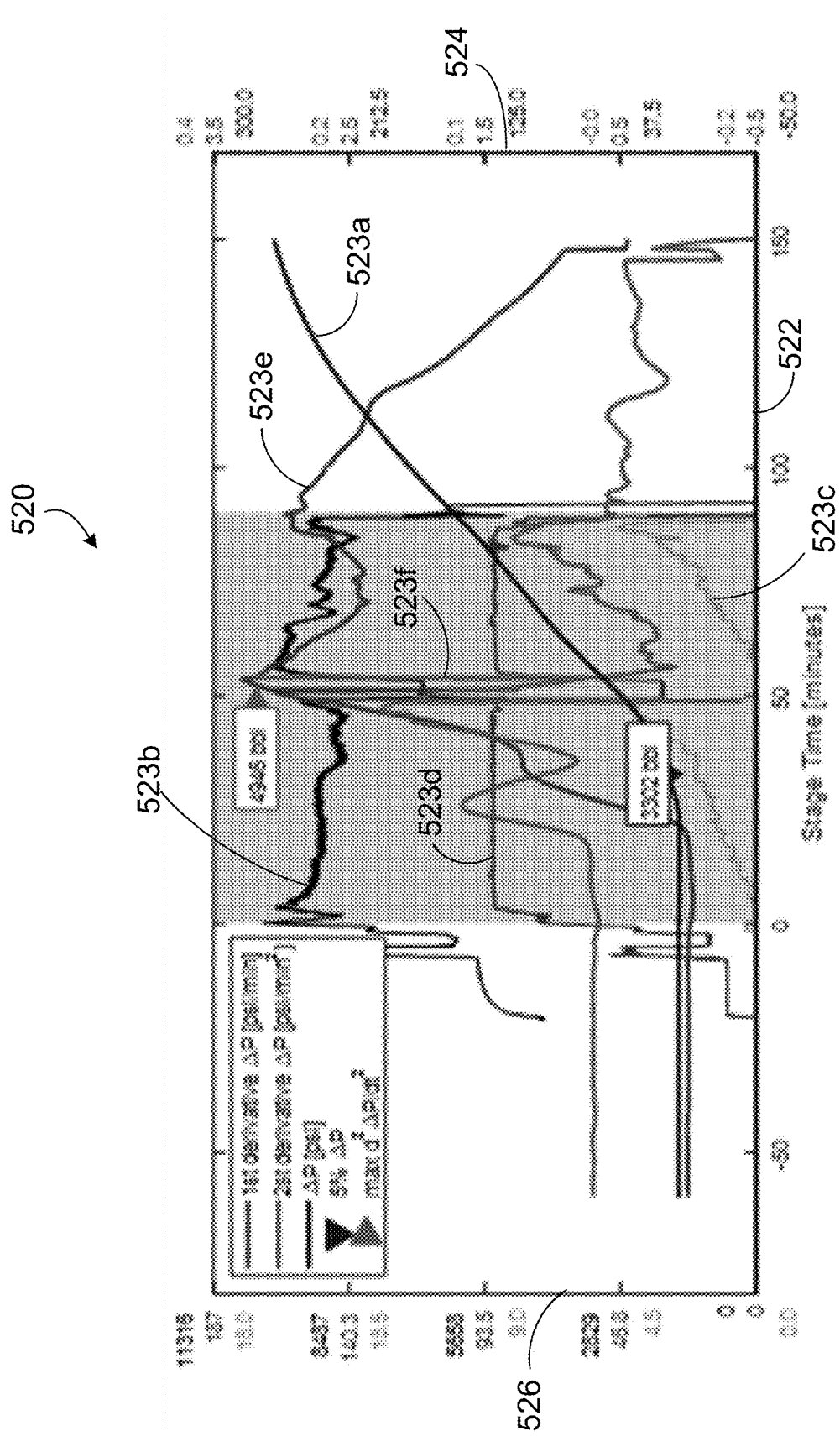
Figure 5C:
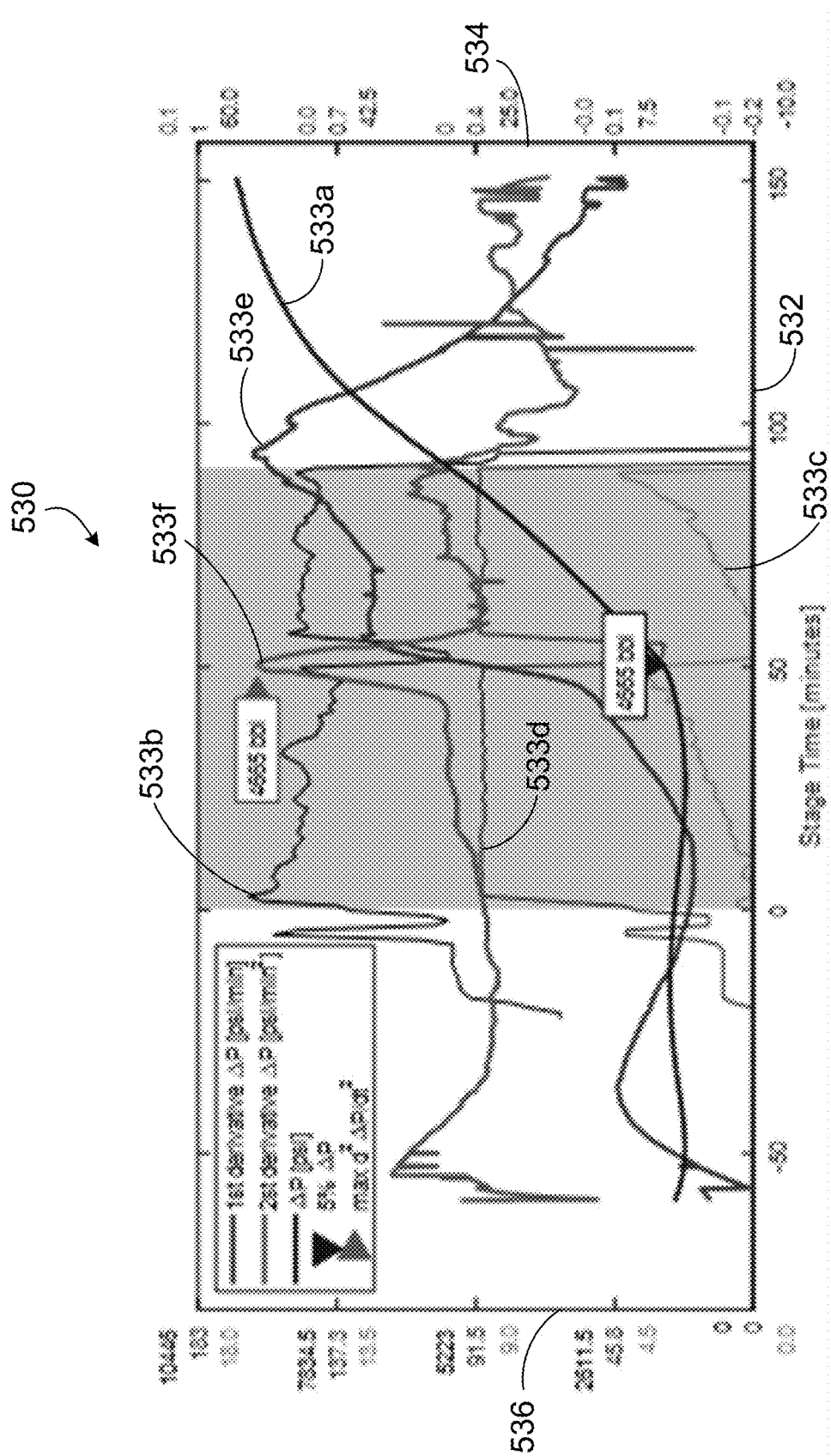

Similar, signal initiations have been determined for two other completion stages shown in FIGS. 5B and 5C. FIG. 5B shows graph 520. Axis 522 represents a time range (in minutes) for a fracturing stage in a treatment wellbore. The axis 524 represents a pressure range (in psi) for a monitor pressure curve 523a that represents pressure signal data from a pressure sensor fluidly coupled to a monitor wellbore less a pressure trend value. The axis 526 represents a pressure range (in psi) for a treating pressure curve 523b, a barrel per minute range of a slurry rate of a hydraulic fracturing fluid used in the treatment wellbore 523c, and a pound per gallon proppant concentration of the hydraulic fracturing fluid used in the treatment wellbore 523d. Graph 520 also shows a first derivative curve 523e and a second derivative curve 523f (both being derivatives of the pressure curve 523a. Just as with graph 500, graph 520 shows a difference in moments in time at which signal initiation occurs based on the signal initiation selection criteria (i.e., a first moment in time after the start of completions for which a value on the pressure curve 523a exceeds 5% of the maximum pressure signal during stage completion time or a first moment in time after the start of completions for which a peak value of the second derivative curve 523f).

FIG. 5C shows graph 530. Axis 532 represents a time range (in minutes) for a fracturing stage in a treatment wellbore. The axis 534 represents a pressure range (in psi) for a monitor pressure curve 533a that represents pressure signal data from a pressure sensor fluidly coupled to a monitor wellbore less a pressure trend value. The axis 536 represents a pressure range (in psi) for a treating pressure curve 533b, a barrel per minute range of a slurry rate of a hydraulic fracturing fluid used in the treatment wellbore 533c, and a pound per gallon proppant concentration of the hydraulic fracturing fluid used in the treatment wellbore 533d. Graph 530 also shows a first derivative curve 533e and a second derivative curve 533f (both being derivatives of the pressure curve 503a. Just as with graphs 500 and 520, graph 530 shows a difference in moments in time at which signal initiation occurs based on the signal initiation selection criteria (i.e., a first moment in time after the start of completions for which a value on the pressure curve 533a exceeds 5% of the maximum pressure signal during stage completion time or a first moment in time after the start of completions for which a peak value of the second derivative curve 533f). In all three examples, using a selection criteria of a first moment in time after the start of completions for which a peak value of a second derivative curve for signal initiation would result in a different (and less accurate) VFR relative to a selection criteria of a first moment in time after the start of completions for which a value on a pressure curve exceeds 5% of the maximum pressure signal during stage completion time for signal initiation.

Figure 5D:
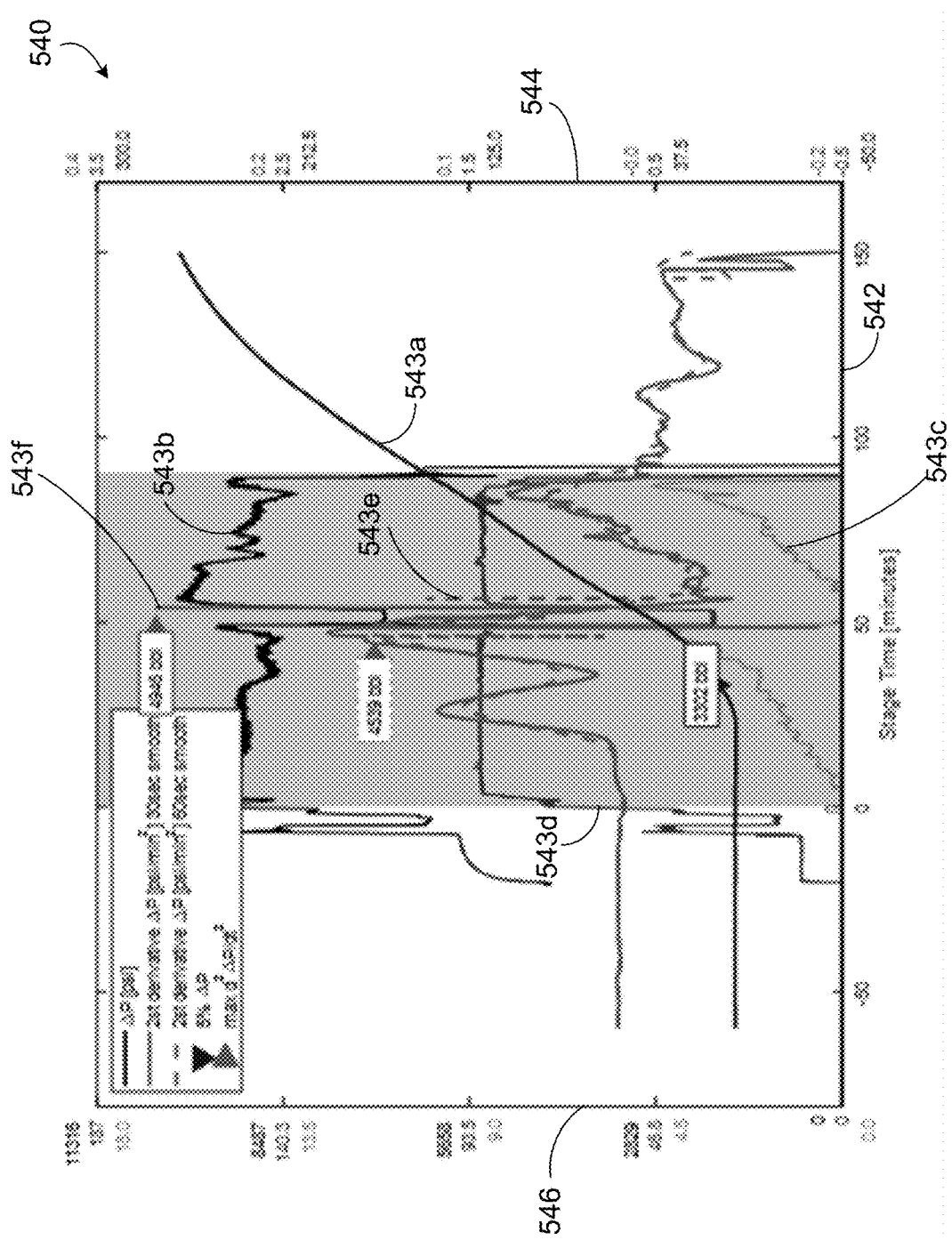

Moreover, taking a first and second time derivative of an acquired pressure signal may result in significant non-smooth (spikes) time series. Therefore, in a pre-processing step of the analysis workflow (prior to applying the derivatives), a signal smoothing operation can be applied. FIG. 5D shows an example of the impact of pre-processing for a second derivative. FIG. 5D shows graph 540. Axis 542 represents a time range (in minutes) for a fracturing stage in a treatment wellbore. The axis 544 represents a pressure range (in psi) for a monitor pressure curve 543a that represents pressure signal data from a pressure sensor fluidly coupled to a monitor wellbore less a pressure trend value. The axis 546 represents a pressure range (in psi) for a treating pressure curve 543b, a barrel per minute range of a slurry rate of a hydraulic fracturing fluid used in the treatment wellbore 543c, and a pound per gallon proppant concentration of the hydraulic fracturing fluid used in the treatment wellbore 543d. Graph 540 also shows a second derivative curve 543e in which a smoothing operation with a window of 60 seconds was applied. Graph 540 also shows a second derivative curve 543f in which a smoothing operation with a window of 30 seconds was applied. The resulting signal initiation for the 30 and 60 second windows are 53.9 minutes (4946 barrels) and 46.6 minutes (4539 barrels), respectively. Because of the potential inaccuracies (as described with reference to FIGS. 5A-5C) with the use of the second derivative as a signal initiation (vs. the use of the pressure curve criteria), as well as the smoothing issues associated with the second derivative, using a definition of signal initiation based on the pressure signal AP (e.g., as described with reference to method 300) can be more advisable.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method, comprising:
   identifying, with one or more hardware processors, pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;
   calculating, with the one or more hardware processors, at least one pressure response value from the pressure response data, the at least one pressure response value comprising a ratio of a first pressure change from the pressure response data to a second pressure change of the pressure response data, and the second pressure change comprises a difference in pressure of the fluid at a second time subsequent to a first time and a trend line pressure of the fluid, and the first time comprises a treatment end time of the hydraulic fracturing treatment, and the treatment end time comprises a shut-in time of the treatment wellbore;
   determining, with the one or more hardware processors, a fracture driven interaction (FDI) between the treatment wellbore and at least one of the one or more monitor wellbores based at least in part on the calculated at least one pressure response value; and preparing, with the one or more hardware processors, a graphic representation of the determined FDI for display on a graphical user interface (GUI).

2. The computer-implemented method of claim 1, wherein the at least one pressure response value comprises a dimensionless value that represents a pressure ratio.

3. The computer-implemented method of claim 1, wherein the first pressure change comprises a difference in pressure of the fluid at the first time and the trend line pressure of the fluid.

4. The computer-implemented method of claim 1, wherein the second time comprises a time subsequent to the treatment end time of the hydraulic fracturing treatment.

5. The computer-implemented method of claim 4, wherein the time subsequent to the treatment end time comprises a time in which a slope of a pressure curve of the recordable change in pressure of the fluid is substantially equal to a slope of a pressure curve of the trend line pressure.

6. The computer-implemented method of claim 1, wherein the at least one pressure response value is between 0 and 1.

7. The computer-implemented method of claim 6, wherein determining the FDI between the treatment wellbore and at least one of the one or more monitor wellbores based at least in part on the calculated at least one pressure response value comprises:
   determining, with the one or more hardware processors, that the FDI between the treatment wellbore and at least one of the one or more monitor wellbores is a direct fluid communication based at least in part on the calculated at least one pressure response value being between 0 and 0.5.

8. The computer-implemented method of claim 7, wherein determining that the FDI between the treatment wellbore and at least one of the one or more monitor wellbores is the direct fluid communication based at least in part on the calculated at least one pressure response value being between 0 and 0.5 comprises:
   determining, with the one or more hardware processors, that the FDI between the treatment wellbore and at least one of the one or more monitor wellbores is the direct fluid communication based at least in part on the calculated at least one pressure response value being between 0 and 0.3.

9. The computer-implemented method of claim 6, wherein determining the FDI between the treatment wellbore and at least one of the one or more monitor wellbores based at least in part on the calculated at least one pressure response value comprises:
   determining, with the one or more hardware processors, that the FDI between the treatment wellbore and at least one of the one or more monitor wellbores is a fluid migration based at least in part on the calculated at least one pressure response value being between 0.5 and 1.

10. The computer-implemented method of claim 9, wherein determining that the FDI between the treatment wellbore and at least one of the one or more monitor wellbores is the fluid migration based at least in part on the calculated at least one pressure response value being between 0.5 and 1 comprises:
   determining, with the one or more hardware processors, that the FDI between the treatment wellbore and at least one of the one or more monitor wellbores is the direct fluid communication based at least in part on the calculated at least one pressure response value being between 0.7 and 1.

11. The computer-implemented method of claim 1, wherein determining the FDI between the treatment wellbore and at least one of the one or more monitor wellbores based at least in part on the calculated at least one pressure response value comprises:
   determining, with the one or more hardware processors, the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment.

12. The computer-implemented method of claim 11, wherein the short term recordable change in pressure of the fluid comprises a maximum pressure increase of the fluid over a first time duration between a treatment start time of the hydraulic fracturing treatment and the treatment end time of the hydraulic fracturing treatment.

13. The computer-implemented method of claim 12, wherein the long term recordable change in pressure of the fluid comprises a maximum pressure increase of the fluid over a second time duration between the treatment start time of the hydraulic fracturing treatment and the treatment end time of the hydraulic fracturing treatment.

14. The computer-implemented method of claim 13, wherein the first time duration comprises about 60 seconds, and the second time duration comprises about 10 minutes.

15. The computer-implemented method of claim 11, wherein determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment comprises:
   determining, with the one or more hardware processors, that the FDI between the treatment wellbore and at least one of the one or more monitor wellbores is a direct fluid communication based at least in part on the calculated at least one pressure response value being between 0 and 0.5 and at least one of:
      the short term recordable change in pressure being greater than about 5% of a total pressure increase of the fluid between the treatment start time and the treatment end time, or
      the long term recordable change in pressure being greater than about 30% of the total pressure increase of the fluid between the treatment start time and the treatment end time.

16. The computer-implemented method of claim 11, wherein determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment comprises:
   determining, with the one or more hardware processors, that the FDI between the treatment wellbore and at least one of the one or more monitor wellbores is a fluid migration based at least in part on the calculated at least one pressure response value being between 0.5 and 1 and at least one of:

the short term recordable change in pressure being about 5% or less of a total pressure increase of the fluid between the treatment start time and the treatment end time, or the long term recordable change in pressure being about 30% or less of the total pressure increase of the fluid between the treatment start time and the treatment end time.

17. The computer-implemented method of claim 11, wherein determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment comprises:

determining, with the one or more hardware processors, that the FDI between the treatment wellbore and at least one of the one or more monitor wellbores is a poroelastic response based at least in part on the calculated at least one pressure response value being between 0 and 0.5 and at least one of:

the short term recordable change in pressure being about 5% or less of a total pressure increase of the fluid between the treatment start time and the treatment end time, or the long term recordable change in pressure being about 30% or less of the total pressure increase of the fluid between the treatment start time and the treatment end time.

18. The computer-implemented method of claim 17, wherein determining that the FDI between the treatment wellbore and at least one of the one or more monitor wellbores is the poroelastic response comprises:

determining, with the one or more hardware processors, that the FDI between the treatment wellbore and at least one of the one or more monitor wellbores is the poroelastic response based at least in part on the calculated at least one pressure response value about 0 and at least one of:

the short term recordable change in pressure being about 5% or less of the total pressure increase of the fluid between the treatment start time and the treatment end time, or the long term recordable change in pressure being about 30% or less of the total pressure increase of the fluid between the treatment start time and the treatment end time.

19. The computer-implemented method of claim 1, wherein determining the FDI between the treatment wellbore and at least one of the one or more monitor wellbores based at least in part on the calculated at least one pressure response value comprises:

determining, with the one or more hardware processors, that the FDI between the treatment wellbore and at least one of the one or more monitor wellbores is a null response based at least in part on the recordable change in pressure of the fluid in response to the hydraulic fracturing treatment being about zero relative to a trend line pressure of the fluid.

20. A computing system, comprising:
one or more memory modules; and
one or more hardware processors communicably coupled to the one or more memory modules and configured to execute instructions stored in the one or more memory modules to perform operations comprising:

identifying pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating at least one pressure response value from the pressure response data the at least one pressure response value comprising a ratio of a first pressure change from the pressure response data to a second pressure change of the pressure response data, and the second pressure change comprises a difference in pressure of the fluid at a second time subsequent to a first time and a trend line pressure of the fluid, and the first time comprises a treatment end time of the hydraulic fracturing treatment, and the treatment end time comprises a shut-in time of the treatment wellbore;

determining a fracture driven interaction (FDI) between the treatment wellbore and at least one of the one or more monitor wellbores based at least in part on the calculated at least one pressure response value; and preparing a graphic representation of the determined FDI for display on a graphical user interface (GUI).

21. The computing system of claim 20, wherein the at least one pressure response value comprises a dimensionless value that represents a pressure ratio.

22. The computing system of claim 20, wherein the first pressure change comprises a difference in pressure of the fluid at the first time and the trend line pressure of the fluid.

23. The computing system of claim 20, wherein the second time comprises a time subsequent to the treatment end time of the hydraulic fracturing treatment.

24. The computing system of claim 23, wherein the time subsequent to the treatment end time comprises a time in which a slope of a pressure curve of the recordable change in pressure of the fluid is substantially equal to a slope of a pressure curve of the trend line pressure.

25. The computing system of claim 20, wherein the at least one pressure response value is between 0 and 1.

26. The computing system of claim 25, wherein determining the FDI between the treatment wellbore and at least one of the one or more monitor wellbores based at least in part on the calculated at least one pressure response value comprises:

determining that the FDI between the treatment wellbore and at least one of the one or more monitor wellbores is a direct fluid communication based at least in part on the calculated at least one pressure response value being between 0 and 0.5.

27. The computing system of claim 26, wherein determining that the FDI between the treatment wellbore and at least one of the one or more monitor wellbores is the direct fluid communication based at least in part on the calculated at least one pressure response value being between 0 and 0.5 comprises:

determining that the FDI between the treatment wellbore and at least one of the one or more monitor wellbores is the direct fluid communication based at least in part on the calculated at least one pressure response value being between 0 and 0.3.

28. The computing system of claim 25, wherein determining the FDI between the treatment wellbore and at least one of the one or more monitor wellbores based at least in part on the calculated at least one pressure response value comprises:
    determining that the FDI between the treatment wellbore and at least one of the one or more monitor wellbores is a fluid migration based at least in part on the calculated at least one pressure response value being between 0.5 and 1.

29. The computing system of claim 28, wherein determining that the FDI between the treatment wellbore and at least one of the one or more monitor wellbores is the fluid migration based at least in part on the calculated at least one pressure response value being between 0.5 and 1 comprises:
    determining that the FDI between the treatment wellbore and at least one of the one or more monitor wellbores is the direct fluid communication based at least in part on the calculated at least one pressure response value being between 0.7 and 1.

30. The computing system of claim 20, wherein determining the FDI between the treatment wellbore and at least one of the one or more monitor wellbores based at least in part on the calculated at least one pressure response value comprises:
    determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment.

31. The computing system of claim 30, wherein the short term recordable change in pressure of the fluid comprises a maximum pressure increase of the fluid over a first time duration between a treatment start time of the hydraulic fracturing treatment and the treatment end time of the hydraulic fracturing treatment.

32. The computing system of claim 30, wherein the long term recordable change in pressure of the fluid comprises a maximum pressure increase of the fluid over a second time duration between the treatment start time of the hydraulic fracturing treatment and the treatment end time of the hydraulic fracturing treatment.

33. The computing system of claim 32, wherein the first time duration comprises about 60 seconds, and the second time duration comprises about 10 minutes.

34. The computing system of claim 30, wherein determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment comprises:
    determining that the FDI between the treatment wellbore and at least one of the one or more monitor wellbores is a direct fluid communication based at least in part on the calculated at least one pressure response value being between 0 and 0.5 and at least one of:
        the short term recordable change in pressure being greater than about 5% of a total pressure increase of the fluid between the treatment start time and the treatment end time, or
        the long term recordable change in pressure being greater than about 30% of the total pressure increase of the fluid between the treatment start time and the treatment end time.

35. The computing system of claim 30, wherein determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment comprises:
    determining that the FDI between the treatment wellbore and at least one of the one or more monitor wellbores is a fluid migration based at least in part on the calculated at least one pressure response value being between 0.5 and 1 and at least one of:
        the short term recordable change in pressure being about 5% or less of a total pressure increase of the fluid between the treatment start time and the treatment end time, or
        the long term recordable change in pressure being about 30% or less of the total pressure increase of the fluid between the treatment start time and the treatment end time.

36. The computing system of claim 30, wherein determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment comprises:
    determining that the FDI between the treatment wellbore and at least one of the one or more monitor wellbores is a poroelastic response based at least in part on the calculated at least one pressure response value being between 0 and 0.5 and at least one of:
        the short term recordable change in pressure being about 5% or less of a total pressure increase of the fluid between the treatment start time and the treatment end time, or
        the long term recordable change in pressure being about 30% or less of the total pressure increase of the fluid between the treatment start time and the treatment end time.

37. The computing system of claim 36, wherein determining that the FDI between the treatment wellbore and at least one of the one or more monitor wellbores is the poroelastic response comprises:
    determining that the FDI between the treatment wellbore and at least one of the one or more monitor wellbores is the poroelastic response based at least in part on the calculated at least one pressure response value about 0 and at least one of:
        the short term recordable change in pressure being about 5% or less of the total pressure increase of the fluid between the treatment start time and the treatment end time, or
        the long term recordable change in pressure being about 30% or less of the total pressure increase of the fluid between the treatment start time and the treatment end time.

38. The computing system of claim 20, wherein determining the FDI between the treatment wellbore and at least one of the one or more monitor wellbores based at least in part on the calculated at least one pressure response value comprises:

determining that the FDI between the treatment wellbore and at least one of the one or more monitor wellbores is a null response based at least in part on the recordable change in pressure of the fluid in response to the hydraulic fracturing treatment being about zero relative to a trend line pressure of the fluid.

39. A computer-implemented method, comprising:

identifying, with one or more hardware processors, pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating, with the one or more hardware processors, at least one pressure response value from the pressure response data, the at least one pressure response value comprising a ratio of a first pressure change from the pressure response data to a second pressure change of the pressure response data, and the second pressure change comprises a difference in pressure of the fluid at a second time subsequent to a first time and a trend line pressure of the fluid, and the first time comprises a treatment end time of the hydraulic fracturing treatment, and the time subsequent to the treatment end time comprises a time in which a slope of a pressure curve of the recordable change in pressure of the fluid is substantially equal to a slope of a pressure curve of the trend line pressure;

determining, with the one or more hardware processors, a fracture driven interaction (FDI) between the treatment wellbore and at least one of the one or more monitor wellbores based at least in part on the calculated at least one pressure response value; and preparing, with the one or more hardware processors, a graphic representation of the determined FDI for display on a graphical user interface (GUI).

40. A computer-implemented method, comprising:

identifying, with one or more hardware processors, pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating, with the one or more hardware processors, at least one pressure response value from the pressure response data;

determining, with the one or more hardware processors, a fracture driven interaction (FDI) between the treatment wellbore and at least one of the one or more monitor wellbores based at least in part on the calculated at least one pressure response value, wherein determining the FDI between the treatment wellbore and at least one of the one or more monitor wellbores based at least in part on the calculated at least one pressure response value comprises:

determining, with the one or more hardware processors, the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment, the long term recordable change in pressure of the fluid comprising a maximum pressure increase of the fluid over a second time duration between a treatment start time of the hydraulic fracturing treatment and a treatment end time of the hydraulic fracturing treatment, and the first time duration comprises about 60 seconds, and the second time duration comprises about 10 minutes; and preparing, with the one or more hardware processors, a graphic representation of the determined FDI for display on a graphical user interface (GUI).

41. A computer-implemented method, comprising:

identifying, with one or more hardware processors, pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating, with the one or more hardware processors, at least one pressure response value from the pressure response data;

determining, with the one or more hardware processors, a fracture driven interaction (FDI) between the treatment wellbore and at least one of the one or more monitor wellbores based at least in part on the calculated at least one pressure response value, wherein determining the FDI between the treatment wellbore and at least one of the one or more monitor wellbores based at least in part on the calculated at least one pressure response value comprises determining, with the one or more hardware processors, the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment, where the determining further comprises:

determining, with the one or more hardware processors, that the FDI between the treatment wellbore and at least one of the one or more monitor wellbores is a direct fluid communication based at least in part on the calculated at least one pressure response value being between 0 and 0.5 and at least one of:

the short term recordable change in pressure being greater than about 5% of a total pressure increase of the fluid between a treatment start time and a treatment end time, or the long term recordable change in pressure being greater than about 30% of the total pressure increase of the fluid between the treatment start time and the treatment end time; and preparing, with the one or more hardware processors, a graphic representation of the determined FDI for display on a graphical user interface (GUI).

42. A computer-implemented method, comprising:

identifying, with one or more hardware processors, pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating, with the one or more hardware processors, at least one pressure response value from the pressure response data;

determining, with the one or more hardware processors, a fracture driven interaction (FDI) between the treatment wellbore and at least one of the one or more monitor wellbores based at least in part on the calculated at least one pressure response value, wherein determining the FDI between the treatment wellbore and at least one of the one or more monitor wellbores based at least in part on the calculated at least one pressure response value comprises determining, with the one or more hardware processors, the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment, where the determining further comprises:

determining, with the one or more hardware processors, that the FDI between the treatment wellbore and at least one of the one or more monitor wellbores is a fluid migration based at least in part on the calculated at least one pressure response value being between 0.5 and 1 and at least one of:

the short term recordable change in pressure being about 5% or less of a total pressure increase of the fluid between a treatment start time and a treatment end time, or the long term recordable change in pressure being about 30% or less of the total pressure increase of the fluid between the treatment start time and the treatment end time; and preparing, with the one or more hardware processors, a graphic representation of the determined FDI for display on a graphical user interface (GUI).

43. A computer-implemented method, comprising:

identifying, with one or more hardware processors, pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating, with the one or more hardware processors, at least one pressure response value from the pressure response data;

determining, with the one or more hardware processors, a fracture driven interaction (FDI) between the treatment wellbore and at least one of the one or more monitor wellbores based at least in part on the calculated at least one pressure response value, wherein determining the FDI between the treatment wellbore and at least one of the one or more monitor wellbores based at least in part on the calculated at least one pressure response value comprises determining, with the one or more hardware processors, the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment, where the determining further comprises:

determining, with the one or more hardware processors, that the FDI between the treatment wellbore and at least one of the one or more monitor wellbores is a poroelastic response based at least in part on the calculated at least one pressure response value being between 0 and 0.5 and at least one of:

the short term recordable change in pressure being about 5% or less of a total pressure increase of the fluid between a treatment start time and a treatment end time, or the long term recordable change in pressure being about 30% or less of the total pressure increase of the fluid between the treatment start time and the treatment end time; and preparing, with the one or more hardware processors, a graphic representation of the determined FDI for display on a graphical user interface (GUI).

44. A computing system, comprising:

one or more memory modules; and one or more hardware processors communicably coupled to the one or more memory modules and configured to execute instructions stored in the one or more memory modules to perform operations comprising:

identifying pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating at least one pressure response value from the pressure response data, the at least one pressure response value comprising a ratio of a first pressure change from the pressure response data to a second pressure change of the pressure response data, and the second pressure change comprises a difference in pressure of the fluid at a second time subsequent to a first time and a trend line pressure of the fluid, and the first time comprises a treatment end time of the hydraulic fracturing treatment, and the time subsequent to the treatment end time comprises a time in which a slope of a pressure curve of the recordable change in pressure of the fluid is substantially equal to a slope of a pressure curve of the trend line pressure;

determining a fracture driven interaction (FDI) between the treatment wellbore and at least one of the one or more monitor wellbores based at least in part on the calculated at least one pressure response value; and preparing a graphic representation of the determined FDI for display on a graphical user interface (GUI).

45. A computing system, comprising:

one or more memory modules; and one or more hardware processors communicably coupled to the one or more memory modules and configured to execute instructions stored in the one or more memory modules to perform operations comprising:

identifying pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating at least one pressure response value from the pressure response data;

determining a fracture driven interaction (FDI) between the treatment wellbore and at least one of the one or more monitor wellbores based at least in part on the calculated at least one pressure response value, wherein determining the FDI between the treatment wellbore and at least one of the one or more monitor wellbores based at least in part on the calculated at least one pressure response value comprises:

determining, with the one or more hardware processors, the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment, the long term recordable change in pressure of the fluid comprising a maximum pressure increase of the fluid over a second time duration between the treatment start time of the hydraulic fracturing treatment and the treatment end time of the hydraulic fracturing treatment, and the first time duration comprises about 60 seconds, and the second time duration comprises about 10 minutes; and preparing a graphic representation of the determined FDI for display on a graphical user interface (GUI).

46. A computing system, comprising:

one or more memory modules; and one or more hardware processors communicably coupled to the one or more memory modules and configured to execute instructions stored in the one or more memory modules to perform operations comprising:

identifying pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating at least one pressure response value from the pressure response data;

determining a fracture driven interaction (FDI) between the treatment wellbore and at least one of the one or more monitor wellbores based at least in part on the calculated at least one pressure response value, wherein determining the FDI between the treatment wellbore and at least one of the one or more monitor wellbores based at least in part on the calculated at least one pressure response value comprises determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment, the determining comprising:

determining that the FDI between the treatment wellbore and at least one of the one or more monitor wellbores is a direct fluid communication based at least in part on the calculated at least one pressure response value being between 0 and 0.5 and at least one of:

the short term recordable change in pressure being greater than about 5% of a total pressure increase of the fluid between the treatment start time and the treatment end time, or the long term recordable change in pressure being greater than about 30% of the total pressure increase of the fluid between the treatment start time and the treatment end time; and preparing a graphic representation of the determined FDI for display on a graphical user interface (GUI).

47. A computing system, comprising:

one or more memory modules; and one or more hardware processors communicably coupled to the one or more memory modules and configured to execute instructions stored in the one or more memory modules to perform operations comprising:

identifying pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;

calculating at least one pressure response value from the pressure response data;

determining a fracture driven interaction (FDI) between the treatment wellbore and at least one of the one or more monitor wellbores based at least in part on the calculated at least one pressure response value, wherein determining the FDI between the treatment wellbore and at least one of the one or more monitor wellbores based at least in part on the calculated at least one pressure response value comprises determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment, the determining comprising:
  determining that the FDI between the treatment wellbore and at least one of the one or more monitor wellbores is a fluid migration based at least in part on the calculated at least one pressure response value being between 0.5 and 1 and at least one of:
    the short term recordable change in pressure being about 5% or less of a total pressure increase of the fluid between the treatment start time and the treatment end time, or
    the long term recordable change in pressure being about 30% or less of the total pressure increase of the fluid between the treatment start time and the treatment end time; and
  preparing a graphic representation of the determined FDI for display on a graphical user interface (GUI).

48. A computing system, comprising:
one or more memory modules; and
one or more hardware processors communicably coupled to the one or more memory modules and configured to execute instructions stored in the one or more memory modules to perform operations comprising:
  identifying pressure response data from one or more pressure sensors, each of the one or more pressure sensors in direct fluid communication with a fluid at least partially enclosed within one or more monitor wellbores formed from a terranean surface to one or more subterranean formations, the pressure response data comprising a recordable change in pressure of the fluid in response to a hydraulic fracturing treatment in a treatment wellbore formed from the terranean formation to initiate one or more hydraulic fractures from the treatment wellbore into the one or more subterranean formations;
  calculating at least one pressure response value from the pressure response data;
  determining a fracture driven interaction (FDI) between the treatment wellbore and at least one of the one or more monitor wellbores based at least in part on the calculated at least one pressure response value, wherein determining the FDI between the treatment wellbore and at least one of the one or more monitor wellbores based at least in part on the calculated at least one pressure response value comprises determining the FDI between the treatment wellbore and at least one of the one or more monitor wellbores based on the calculated at least one pressure response value and at least one of a short term recordable change in pressure of the fluid during the hydraulic fracturing treatment or a long term recordable change in pressure of the fluid during the hydraulic fracturing treatment, the determining comprising:
    determining that the FDI between the treatment wellbore and at least one of the one or more monitor wellbores is a poroelastic response based at least in part on the calculated at least one pressure response value being between 0 and 0.5 and at least one of:
      the short term recordable change in pressure being about 5% or less of a total pressure increase of the fluid between the treatment start time and the treatment end time, or
      the long term recordable change in pressure being about 30% or less of the total pressure increase of the fluid between the treatment start time and the treatment end time; and
  preparing a graphic representation of the determined FDI for display on a graphical user interface (GUI).

\* \* \* \* \*

UNITED STATES PATENT AND TRADEMARK OFFICE
CERTIFICATE OF CORRECTION

| | |
|---|---|
| PATENT NO. | : 11,624,277 B2 |
| APPLICATION NO. | : 17/380752 |
| DATED | : April 11, 2023 |
| INVENTOR(S) | : Erica Wilhelmina Catharina Coenen |

It is certified that error appears in the above-identified patent and that said Letters Patent is hereby corrected as shown below:

In the Claims

Column 26, Line 14, Claim 20 delete "data" and insert -- data, --.

Signed and Sealed this
Thirtieth Day of May, 2023

Katherine Kelly Vidal
*Director of the United States Patent and Trademark Office*